US012732081B2

(12) United States Patent
Kuo et al.

(10) Patent No.: US 12,732,081 B2
(45) Date of Patent: Sep. 8, 2026

(54) VOICE COIL MOTOR, CAMERA MODULE, AND ELECTRONIC DEVICE

(71) Applicant: HUAWEI TECHNOLOGIES CO., LTD., Guangdong (CN)

(72) Inventors: Li-Te Kuo, Dongguan (CN); Yushun Wu, Dongguan (CN); Zhuolin Cai, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 552 days.

(21) Appl. No.: 18/316,361

(22) Filed: May 12, 2023

(65) Prior Publication Data

US 2023/0283157 A1 Sep. 7, 2023

Related U.S. Application Data

(63) Continuation of application No. PCT/CN2021/129605, filed on Nov. 9, 2021.

(30) Foreign Application Priority Data

Nov. 13, 2020 (CN) ......................... 202011275173.6

(51) Int. Cl.
*H02K 41/035* (2006.01)
*G03B 13/36* (2021.01)
(Continued)

(52) U.S. Cl.
CPC ......... *H02K 41/0354* (2013.01); *G03B 13/36* (2013.01); *H02K 3/26* (2013.01);
(Continued)

(58) Field of Classification Search
CPC .... H02K 41/0354; H02K 3/26; H02K 11/215; H02K 41/0356; H02K 2203/03;
(Continued)

(56) References Cited

U.S. PATENT DOCUMENTS 7,633,190 B2 12/2009 Liu et al.
2006/0214520 A1* 9/2006 Tseng ....................... G02B 7/02 310/12.32
2017/0139225 A1 5/2017 Lim

FOREIGN PATENT DOCUMENTS

CN 201322819 Y 10/2009
CN 101960352 A 1/2011
(Continued)

OTHER PUBLICATIONS

CN111580324A English translation (Year: 2025).*
(Continued)

*Primary Examiner* — Christopher M Koehler
*Assistant Examiner* — Viswanathan Subramanian

(57) ABSTRACT

The technology of this application relates to a voice coil motor, a camera module, and an electronic device. The voice coil motor includes a base, a slide rail assembly, disposed in front and rear directions, a movable base, configured to carry a first lens and slidably disposed on the base through the slide rail assembly, and a first electromagnetic drive assembly and a second electromagnetic drive assembly, configured to supply driving force to the movable base, to drive the movable base to slide in the front and rear directions of the base. The first electromagnetic drive assembly and the second electromagnetic drive assembly are respectively disposed on two sides of the slide rail assembly.

16 Claims, 17 Drawing Sheets

(51) Int. Cl.
*H02K 3/26* (2006.01)
*H02K 11/215* (2016.01)
*H04N 23/54* (2023.01)

(52) U.S. Cl.
CPC ....... *H02K 11/215* (2016.01); *H02K 41/0356* (2013.01); *H02K 2203/03* (2013.01); *H04N 23/54* (2023.01)

(58) Field of Classification Search
CPC .. H02K 2203/06; H02K 2211/03; H02K 3/47; H02K 11/30; H02K 33/16; G03B 13/36; G03B 3/10; G03B 30/00; G03B 2205/0069; H04N 23/54; H04N 23/55; G02B 7/09; G02B 5/208
See application file for complete search history.

(56) References Cited

FOREIGN PATENT DOCUMENTS

| | | | |
|---|---|---|---|
| CN | 104136985 | B | 3/2018 |
| CN | 207908779 | U | 9/2018 |
| CN | 106444218 | B | 1/2020 |
| CN | 209982312 | U | 1/2020 |
| CN | 111103670 | A | 5/2020 |
| CN | 111432096 | A | 7/2020 |
| CN | 211061758 | U | 7/2020 |
| CN | 111580324 | A | 8/2020 |
| CN | 211905830 | U | 11/2020 |
| CN | 114488459 | A | 5/2022 |
| JP | H0829668 | A | 2/1996 |
| JP | H11149030 | A | 6/1999 |
| JP | 2015025827 | A | 2/2015 |
| TW | 200525859 | A | 8/2005 |
| WO | 2020174325 | A2 | 9/2020 |

OTHER PUBLICATIONS

CN211905380U English translation (Year: 2025).*
Extended European Search Report for EP Application No. 21891100.6 dated Mar. 13, 2024, 10 pages.
PCT International Search Report for PCT Application No. PCT/CN2021/129605 dated Nov. 9, 2021, 9 pages.

* cited by examiner

VOICE COIL MOTOR, CAMERA MODULE, AND ELECTRONIC DEVICE

CROSS-REFERENCE TO RELATED APPLICATIONS

This application is a continuation of International Application No. PCT/CN2021/129605, filed on Nov. 9, 2021, which claims priority to Chinese Patent Application No. 202011275173.6, filed on Nov. 13, 2020. The disclosures of the aforementioned applications are hereby incorporated by reference in their entireties.

TECHNICAL FIELD

This application relates to the field of imaging technologies, and more specifically, to a voice coil motor, a camera module, and an electronic device.

BACKGROUND

In recent years, with development of optical imaging technologies, people have increasingly high requirements on a photographing function of a portable electronic device. Not only a camera module configured in the electronic device is required to implement functions such as background blurring and clear photographing at night, but also the camera module configured in the electronic device is required to implement telephoto photography and macro photography.

Currently, a voice coil motor (VCM) is usually used to perform focusing processing on the camera module. Because a focal length of telephoto photography is short, a required motor stroke is small, so that a current voice coil motor can meet a use requirement of telephoto photography. However, macro photography usually needs to photograph a related object at a short distance. A shorter working distance indicates a larger required motor stroke. For a camera module that is currently configured in a mobile phone and that has a telephoto photography function, because a stroke of a voice coil motor is short, a focusing distance may exceed a maximum stroke of the voice coil motor. As a result, it may be difficult to focus during macro photography, and effect of macro photography is poor.

In view of this, a voice coil motor having a long stroke is provided, to meet use requirements of both telephoto photography and macro photography. This becomes a technical problem that needs to be resolved.

SUMMARY

This application provides a voice coil motor, a camera module, and an electronic device. A structure of the voice coil motor is improved, so that a stroke of the voice coil motor is large, and use requirements of both telephoto photography and macro photography can be met.

According to a first aspect, a voice coil motor is provided, including: a base; a slide rail assembly, disposed along front and rear directions; a movable base, configured to carry a first lens, and slidably disposed on the base through the slide rail assembly; and a first electromagnetic drive assembly and a second electromagnetic drive assembly, configured to supply driving force to the movable base, to drive the movable base to slide in the front and rear directions of the base. The first electromagnetic drive assembly and the second electromagnetic drive assembly are respectively disposed on the two sides of the slide rail assembly.

According to the voice coil motor provided in this application, the movable base is disposed on the base in the sliding manner through the slide rail assembly, and may slide forward and backward relative to the base, so that the movable base has a larger moving range relative to the base. Therefore, the voice coil motor has a larger motor stroke, a use requirement of both telephoto photography and macro photography can be met, and a user can flexibly switch between two working modes of telephoto photography and macro photography. This improves user experience.

The voice coil motor provided in this application includes a first electromagnetic drive assembly and a second electromagnetic drive assembly that are respectively disposed on two opposite sides of the slide rail assembly. The two sides of the slide rail assembly may simultaneously provide driving force for the movable base. Compared with a single-side force, a motion tilt angle generated when the movable base slides can be avoided, so that sliding of the movable base can be ensured more stable and smooth. In addition, position information of the movable base collected by a displacement sensor is more accurate, and closed-loop control accuracy of the voice coil motor can be improved. Therefore, a photographing effect of a camera module can be improved.

Optionally, the first electromagnetic drive assembly and the second electromagnetic drive assembly are symmetrically disposed relative to the slide rail assembly, so that symmetrical output forces on the two sides can be ensured, and the motion tilt angle caused by an uneven output force can be avoided. This further improves motion stability of the movable base and further improves the photographing effect of the camera module.

For example, the first electromagnetic drive assembly and the second electromagnetic drive assembly are symmetrically disposed on the two opposite sides of the movable base. The first electromagnetic drive assembly and the second electromagnetic drive assembly respectively provide driving forces parallel to the front and rear directions to the movable base.

In a possible implementation, the slide rail assembly includes a first sliding shaft and a second sliding shaft disposed in parallel and spaced on the base, and a first sliding groove and a second sliding groove disposed at the bottom of the movable base. The first sliding shaft is slidably disposed in the first sliding groove. The second sliding shaft is slidably disposed in the second sliding groove. The slide rail assembly provided in this application includes a sliding shaft and a groove that work with each other, so that the movable base slides smoothly on the base.

Optionally, a friction surface of the sliding shaft and/or the groove is coated with grease, so that a friction force between the sliding shaft and/or the groove can be reduced, and the movable base slides smoothly on the base.

In a possible implementation, the first sliding groove is a V groove, the second sliding groove is a U groove, and a groove width of the U groove is greater than a width of the second sliding shaft.

The V groove may better perform sliding guidance, and the U groove may be used for tolerance. Disposition of the U groove may allow the movable base and the like to have a production error, to ensure that the movable base can be successfully installed (e.g., sleeved) on the sliding shaft when the size of the movable base slightly increases or decreases due to the production error. A fault tolerance rate can be improved by disposing the U groove. This helps reduce production costs.

In a possible implementation, the first electromagnetic drive assembly includes a first magnet and a first coil that are parallel to each other and disposed opposite to each other. The second electromagnetic drive assembly includes a second magnet and a second coil that are parallel to each other and disposed opposite to each other. The first magnet and the second magnet are fastened to two opposite sides of the movable base. The first coil and the second coil are fastened to the base.

In a possible implementation, both the first magnet and the second magnet have N poles and S poles alternately disposed along the front and rear directions. An N pole and an S pole of the first magnet face the first coil. An N pole and an S pole of the second magnet face the second coil.

In a possible implementation, the first magnet is composed of a plurality of independent magnets, or the first magnet is an integrated magnetizing structure. The second magnet is composed of a plurality of independent magnets, or the second magnet is an integrated magnetizing structure.

In a possible implementation, the first coil is electrically connected to a first circuit board, and is fastened to the base through the first circuit board. The second coil is electrically connected to a second circuit board, and is fastened to the base through the second circuit board. The first circuit board is electrically connected to the second circuit board through a connection circuit board.

Optionally, the first circuit board, the second circuit board, and the connection circuit board may be printed circuit boards.

Optionally, the first circuit board, the second circuit board, and the connection circuit board may be flexible printed circuit boards, printed circuit boards, or rigid flexible printed circuit boards.

For example, the first circuit board, the second circuit board, and the connection circuit board are flexible printed circuit boards and are of an integrated structure.

In a possible implementation, the first sliding shaft and the second sliding shaft are made of magnetic conductive materials. There is magnetic attachment force between the first magnet and the first sliding shaft. There is magnetic attachment force between the second magnet and the second sliding shaft.

When there is the magnetic attachment force between the sliding shaft and the magnet, when the electronic device to which the voice coil motor is applied performs photographing in any direction such as the sky, the floor, or the horizontal direction, the movable base can be kept always closely attached to the sliding shaft without loosening. This maintains motion stability and improves use performance of the voice coil motor.

In a possible implementation, the base includes a rear limiting frame located on a rear side of the slide rail assembly and a front limiting frame located on a front side of the slide rail assembly. The rear limiting frame and the front limiting frame are used to limit a sliding range of the movable base in the front and rear directions.

In a possible implementation, an extension part is protrudingly disposed on a side of the movable base facing the rear limiting frame. A positioning groove for inserting the extension part is formed on the rear limiting frame.

The extension part that extends in a direction towards the limiting frame is disposed on the movable base, so that installation of the magnet can be facilitated. The positioning groove is correspondingly disposed on the rear limiting frame, so that insertion of the extension part can be facilitated. On one hand, better positioning control can be performed on sliding of the movable base, and on the other hand, the movable base can be close to the rear limiting frame, so that a stroke of the movable base (that is, the motor) can be increased.

In a possible implementation, an elastic buffer is disposed on a side of the rear limiting frame facing the movable base; and/or the elastic buffer is disposed on a side of the front limiting frame facing the movable base.

In this application, the elastic buffer is disposed on the side of the rear limiting frame and the front limiting frame facing the movable base, to buffer impact of the movable base, avoid an abnormal sound problem caused by a long-distance impact, and reduce a dust problem after the impact. This improves use performance of the voice coil motor.

In a possible implementation, an elastic buffer is disposed on a side of the movable base facing the rear limiting frame; and/or the elastic buffer is disposed on a side of the movable base facing the front limiting frame.

In a possible implementation, a second lens installation groove for installing a second lens is disposed on the rear limiting frame.

In a possible implementation, the voice coil motor further includes a displacement sensor assembly configured to sense a position of the movable base, and a processor configured to receive a sensing signal of the displacement sensor assembly and control currents of the first coil and the second coil. Through the foregoing disposition, the voice coil motor provided in this embodiment of this application can implement closed-loop control.

Optionally, the processor may be a control circuit.

In a possible implementation, the displacement sensor assembly includes a magnetic gate fastened to the movable base and a magnetic resistance sensor fastened to the base. The magnetic resistance sensor is configured to sense a magnetic field change of the magnetic gate and transmit the sensing signal to the processor.

In this application, the magnetic gate and the magnetic resistance sensor that work with each other are disposed to detect the position of the movable base, so that the voice coil motor provided in this application has a long-travel position detection capability and a closed-loop control capability.

Optionally, a groove is disposed at the bottom of the movable base. The magnetic gate is fastened to the groove. The magnetic resistance sensor is fastened to a third circuit board, and is fastened to the base through the third circuit board.

Optionally, the magnetic resistance sensor is electrically connected to one end of the third circuit board, and a wiring terminal or a connector is disposed on the other end of the third circuit board, so that the third circuit board can be electrically connected to the processor conveniently.

Optionally, the magnetic resistance sensor may be any one of a tunnel magnetic resistance sensor, an anisotropic magnetic resistance sensor, a giant magnetic resistance sensor, an ordinary magnetic resistance sensor, or the like.

In a possible implementation, the displacement sensor assembly includes a third magnet fastened to the movable base and two Hall effect sensors fastened to the base. A magnetic pole direction of the third magnet is disposed obliquely relative to the front and rear directions. The two Hall effect sensors are configured to sense a magnetic field change of the third magnet, and transmit the sensing signal to the processor.

In this application, the third magnet and the two Hall effect sensors that work with each other are disposed to detect the position of the movable base, so that the voice coil motor provided in this application has a long-travel position detection capability and a closed-loop control capability. In addition, a moving position of the movable base can be accurately determined based on the sensing signal of the two Hall effect sensors and a preset algorithm, so that precise focusing can be implemented.

In a possible implementation, the voice coil motor further includes a fourth magnet fastened to the bottom of the movable base. The fourth magnet and the third magnet are symmetrically disposed opposite to the slide rail assembly. The fourth magnet is disposed to balance gravity on the two sides of the movable base and the magnetic attachment force between the movable base and the sliding shaft, thereby facilitating stable and smooth sliding of the movable base, and improving use performance of the voice coil motor.

In a possible implementation, the movable base includes two installing brackets and a metal connecting piece. The two installing brackets are fastened through the metal connecting piece. Overall mechanical strength of the movable base can be improved by disposing the metal connecting piece.

In a possible implementation, the metal connecting piece includes two magnetic conductive sheets and a support bottom. The two magnetic conductive sheets are fastened through the support bottom. The two magnetic conductive sheets are respectively fastened to the two installing brackets, and are respectively located on the inner sides of the first magnet and the second magnet. Through the foregoing disposition, magnetic resistance on an inner side of a magnet can be reduced, and magnitude of a magnetic field on an outer side of the magnet can be increased. This helps increase output force of a coil, and further helps improve response efficiency and a speed of the movable base.

In a possible implementation, the metal connecting piece is made of a magnetic conductive material by using an integrated molding process.

According to a second aspect, a camera module is provided, including a first lens and the voice coil motor provided in any possible implementation of the first aspect. The voice coil motor is configured to drive the first lens to move.

In a possible implementation, the camera module further includes a second lens disposed in an object side direction of the first lens, and an image sensor disposed in an image side direction of the first lens.

Optionally, the second lens may be fastened to a second lens installation groove of the voice coil motor.

Optionally, the image sensor may be a complementary metal oxide semiconductor image sensor or a charge coupled device image sensor. The image sensor is mainly configured to perform optical-to-electrical conversion and analog/digital signal conversion on an optical signal of light, to output image data to be displayed by a display unit such as a display screen.

In a possible implementation, the camera module further includes a reflective element disposed in an object side direction of the second lens. In other words, the camera module may be a periscope camera module.

Optionally, the reflective element may be a triangular prism or a reflector.

In a possible implementation, an infrared filter is further disposed between the first lens and the image sensor. An infrared ray can be cut off, filtered, and the like by disposing the infrared filter, thereby improving imaging quality. The infrared filter may be, for example, a white glass filter or a blue glass filter.

According to a third aspect, an electronic device is provided, including the camera module provided in any possible implementation of the second aspect.

Optionally, the electronic device may be a mobile phone, a tablet computer, a laptop computer, a video camera, a video recorder, a camera, an intelligent robot, in-vehicle surveillance, or a device that has a photographing or video shooting function and that is in another form.

REFERENCE NUMERALS

Figure 1:
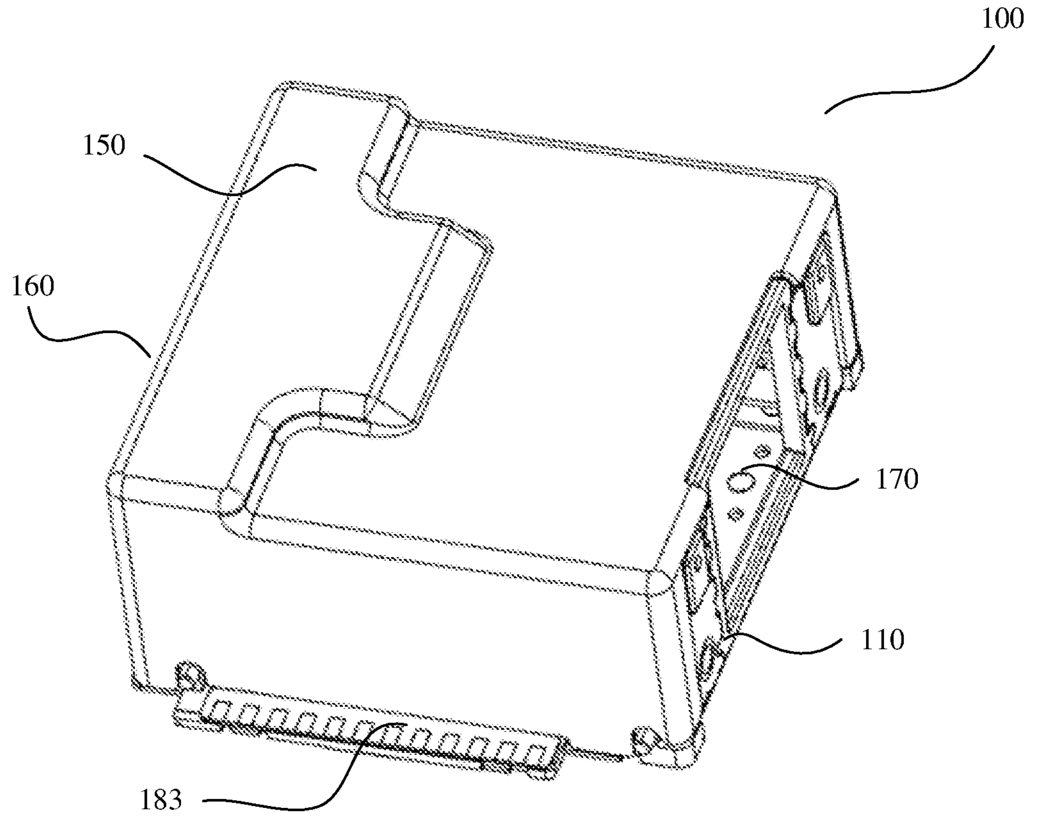
FIG. 1 is an example schematic diagram of an overall structure of a voice coil motor according to an embodiment of this application.

100: voice coil motor;

110: base; 111: bottom plate; 112: rear limiting frame; 113: front limiting frame; 114: second lens installation groove; 115: elastic buffer; 1151: connecting rib; 116: positioning groove; 117: first sliding shaft; 118: second sliding shaft; 119: metal reinforcing plate;

120: movable base; 121: installing bracket; 1211: magnet installation groove; 1212: buffer installation groove; 1213: through groove; 122: metal connecting piece; 1221: magnetic conductive sheet; 1222: support bottom: 1223: lifting part; 123: first lens installation groove; 124: extension part; 125: connecting beam; 127: first sliding groove; 128: second sliding groove;

130: first electromagnetic drive assembly; 131: first magnet; 132: first coil; 133: first circuit board; 134: limiting protrusion; 135: fifth magnet; 136: sixth magnet; 137: magnetic conductive frame; 138: magnetic conductive insertion block;

140: second electromagnetic drive assembly; 141: second magnet; 142: second coil; 143: second circuit board; 144: connection circuit board;

150: cover body; 151: top plate; 152: side panel;

160: light inlet;

170: light outlet;

180: displacement sensor assembly; 181: magnetic gate; 182: magnetic resistance sensor; 183: third circuit board; 184: third magnet; 185: Hall effect sensor; 186: fourth magnet; 187: fourth circuit board;

200: camera module; 210: reflective element; 220: second lens; 230: first lens; 240: infrared filter; 250: image sensor;

300: electronic device; 310: electronic device housing; and 320: display screen.

Description of Embodiments

The following describes technical solutions of this application with reference to accompanying drawings. It is clear that the described embodiments are merely some but not all of embodiments of this application.

In the descriptions of this application, it should be noted that, unless otherwise specified and limited, terms "installation", "connection", and "fastening" should be understood in a broad sense. For example, a connection may be a fixed connection, a detachable connection, or an integrated connection. Alternatively, a connection may be a mechanical connection or an electrical connection, or may mean mutual communication. Alternatively, a connection may be a direct connection, or an indirect connection through an intermediate medium, or may be a connection between two elements or an interaction relationship between two elements. A person of ordinary skill in the art may interpret specific meanings of the foregoing terms in this application according to specific cases.

In the descriptions of this application, it should be understood that directions or position relationships indicated by the terms "up", "down", "side", "inside", "outside", "top", "bottom", and the like are based on the directions or position relationships shown in the accompanying drawings, and are merely intended to describe this application and simplify the descriptions, but are not intended to indicate or imply that an apparatus or an element shall have a specific direction or be composed and operated in a specific direction, and therefore shall not be understood as a limitation on this application.

It should be further noted that in embodiments of this application, a same reference numeral indicates a same component or a same part. For same parts in embodiments of this application, only one part or component marked with a reference numeral may be used as an example in the figure. It should be understood that the reference numeral is also applicable to another same part or component.

In the descriptions of this application, it should be noted that the term "and/or" describes only an association relationship for describing associated objects and represents that at least three relationships may exist. For example, A and/or B may represent the following three cases: Only A exists, both A and B exist, and only B exists.

For ease of understanding, the following first explains and describes certain technical terms in this application. The descriptions provided below are of course non-limiting.

Lens: The lens is a component that uses a lens refraction principle to enable light of a scene to pass through the lens to form a clear image on a focal plane. One lens may include one or more lenses. Herein, the lens may be a concave lens or a convex lens.

Optical axis: The optical axis is a direction of light conducted by an optical system. Refer to main light of a central field of view. An optical axis of a symmetric transmission system generally coincides with a rotation center line of the optical system. Optical axes of an off-axis system and a reflection system are also presented as broken lines.

Object side and image side: A lens or lenses are used as a boundary, a side on which a photographed object is located is the object side, and a side on which an image of the photographed object is located is the image side.

Focus: The focus is also referred to as light focus. A process of changing an object distance and an image distance through a focusing mechanism of a camera to make a photographed object clear is focus. Generally, a digital camera has a plurality of focusing manners, which are respectively auto focus, manual focus, multi-focus, and the like.

Auto focus: Auto focus is a manner in which reflected light is received by a sensor (for example, a charge-coupled device (CCD)) on a camera by using a principle of light reflection of an object, and processed by a computer to drive an electric focusing apparatus to focus.

Voice coil motor: The voice coil motor (VCM) is also referred to as a voice coil actuator or a voice coil linear motor because its structure is similar to that of a voice coil of a speaker. The voice coil motor is an apparatus for converting electric power into mechanical power, and generates motion by using an action exerted on a magnetic pole by a magnetic field of a permanent magnet and a magnetic field generated by an electrified coil conductor, so that the magnetic pole drives a lens to make linear motion or motion with a limited sway angle. The voice coil motor is mainly used in small stroke, high speed, and high acceleration motion, and is suitable for narrow space.

For a camera module, the voice coil motor is usually used for focusing and optical image stabilization (OIS). In this application, the voice coil motor is mainly used for focusing.

In recent years, with development of optical imaging technologies, people have increasingly high requirements on a photographing function of a portable electronic device, such as a mobile phone. Not only a camera module configured in the electronic device is required to implement functions such as background blurring and clear photographing at night, but also the camera module configured in the electronic device is required to implement telephoto photography and macro photography.

Because the voice coil motor has advantages such as a simple structure, a small size, low energy consumption, no noise, a fast response speed, accurate displacement, and a low price, currently, the voice coil motor (VCM) is usually used to perform focusing processing on the camera module.

The voice coil motor usually includes three parts: a fastening piece, a movable piece, and an actuator. The fastening piece has accommodation space, and is configured to accommodate the movable piece. The movable piece is movably disposed on the fastening piece, and is configured to fasten an adjustable lens group. The actuator is configured to drive the movable piece to perform translation, to change a distance between the adjustable lens group and a fastened lens group. This implements lens focusing.

Specifically, the actuator usually includes a combination of a coil and a magnet. The coil and the magnet may be respectively fastened to the fastening piece and the movable piece, and may be disposed in parallel. Driving force can be provided to the magnet by connecting a direct current to the coil. A magnitude and a direction of force of the magnet covered by a magnetic field can be controlled by changing a magnitude and a direction of the direct current of the coil. The magnet may provide the driving force to the movable piece for translation. The movable piece further drives the adjustable lens group to approach or move away from the fastened lens group. This implements auto focus of the lens.

When the mobile phone performs telephoto photography, a photographed object is far away from a user. The photographed object is usually a large object, for example, a scenery or a building, and easily occupies an entire picture. Because a focal length of telephoto photography is usually short, a voice coil motor stroke that needs to be occupied is also small.

Macro photography refers to photographing an object at a large magnification rate at a short photographing distance, and is usually used to photograph subtle objects, such as flowers and insects. Macro photography usually needs to photograph a related object at a short distance. A shorter working distance indicates a longer stroke of a voice coil motor that needs to be occupied.

To enable a same camera module to perform both telephoto photography and macro photography, the adjustable lens group in the camera module needs to have a dragging capability of a long stroke. For a camera module that is dragged by using the voice coil motor, the voice coil motor needs to have an excessively large stroke.

Currently, the stroke of the voice coil motor is usually limited, and can only meet a use requirement of telephoto photography, but cannot meet a use requirement of macro photography. Specifically, it is difficult for a current camera module having a telephoto photography function to photograph objects that are close to each other, and the objects cannot be photographed large enough and clear enough. When a photographed object is close to a camera, it is difficult to focus (a distance required for focusing exceeds a stroke range of the current voice coil motor). As a result, an image is blurry. Because of this reason, currently, most mobile phone cameras can only focus at a place 6 to 7 centimeters away from the lens. When the camera continues to move closer to the object, the camera module cannot focus at all, and shooting effect is always unsatisfactory.

Based on this, embodiments of this application provide a voice coil motor, a lens module, and an electronic device. A structure of the voice coil motor is improved, so that a large stroke of the voice coil motor can meet both a use requirement of telephoto photography and a use requirement of macro photography. Therefore, a user can flexibly switch between the two working modes of telephoto photography and macro photography, thereby improving use experience of the user.

Figure 2:
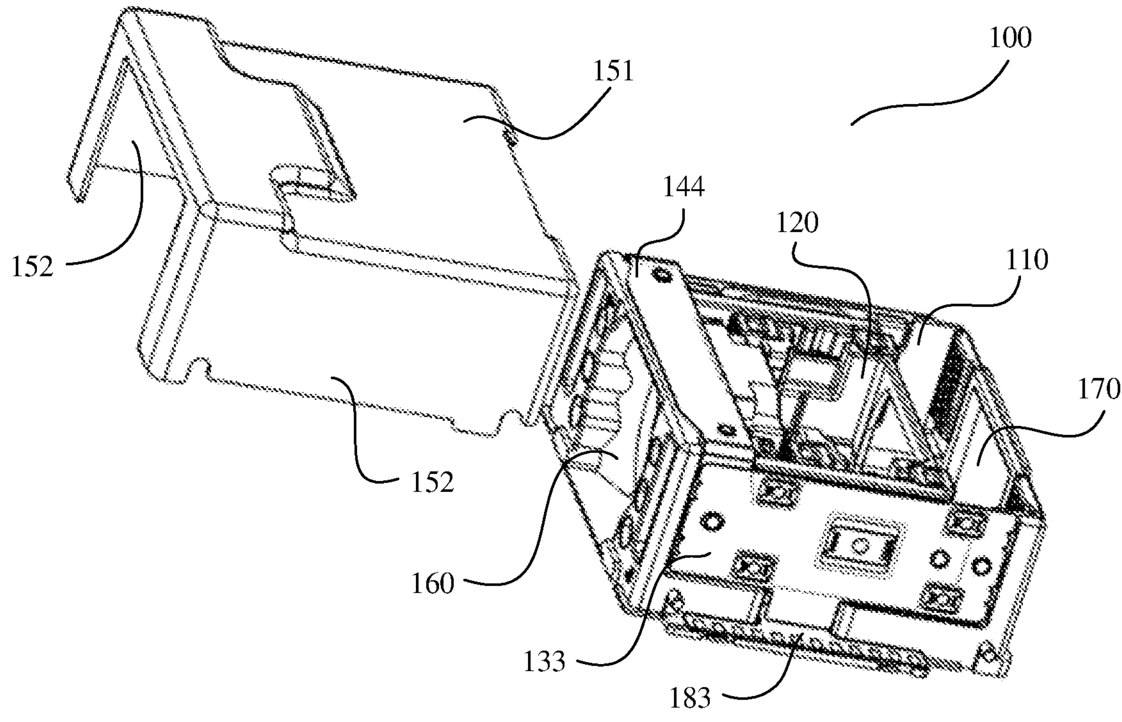
FIG. 2 is an example exploded view of a structure of a voice coil motor according to an embodiment of this application.
Figure 3:
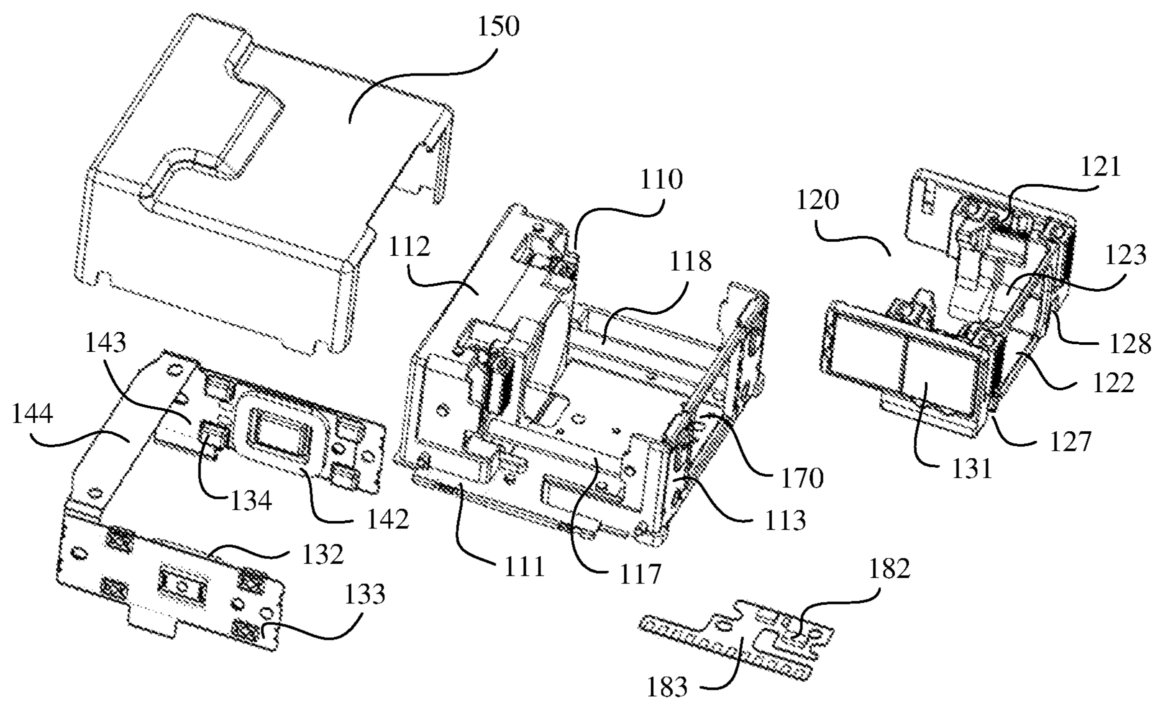
FIG. 3 is an example exploded view of another structure of a voice coil motor according to an embodiment of this application.
Figure 4:
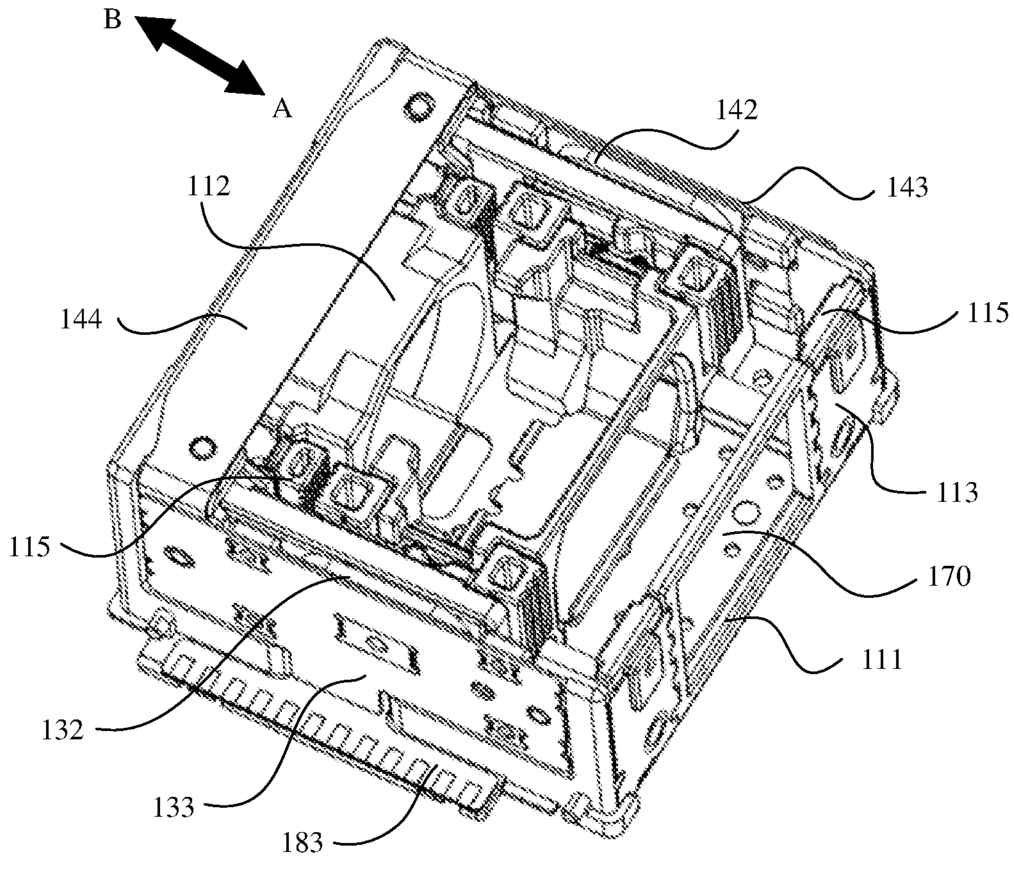
FIG. 4 is an example schematic diagram of a structure of a voice coil motor after a cover is removed according to an embodiment of this application.
Figure 5:
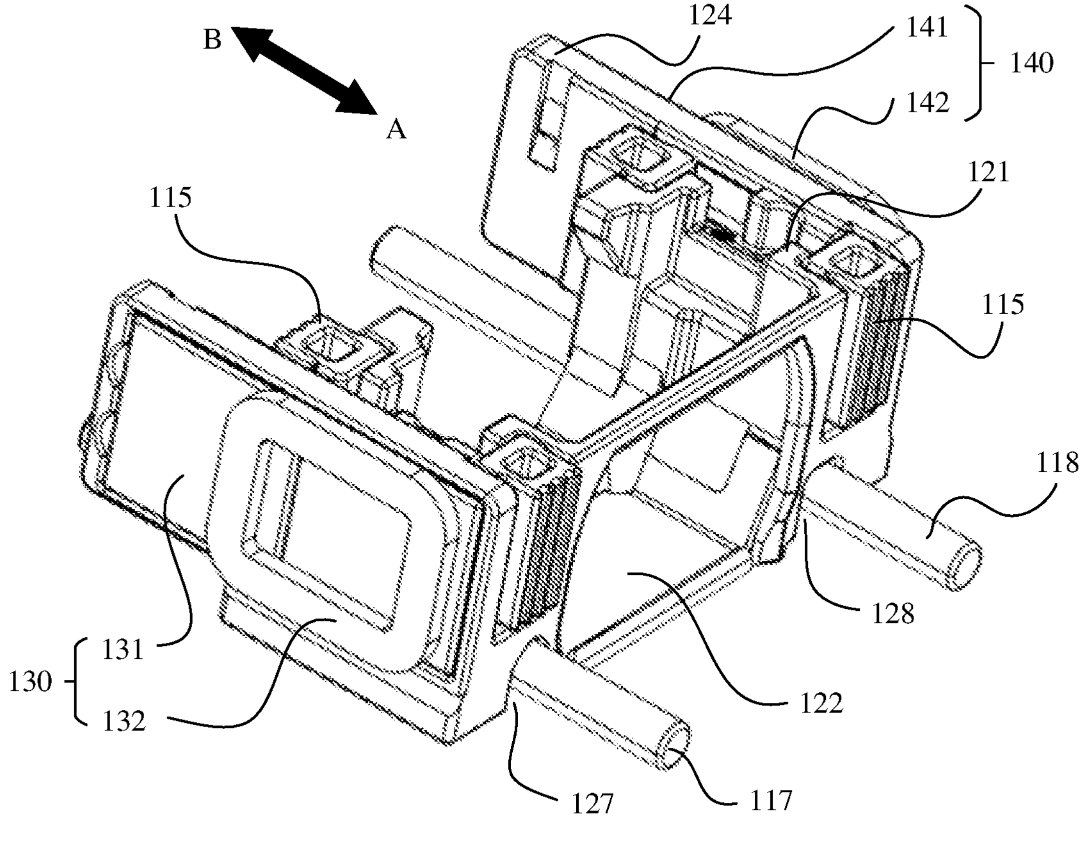
FIG. 5 is an example schematic diagram of a structure in which an electromagnetic drive assembly drives a movable base to move.

According to a first aspect, an embodiment of this application first provides a voice coil motor. The voice coil motor can be configured to drive a lens of a camera module to move, to implement focusing. FIG. 1 is a schematic diagram of an overall structure of a voice coil motor 100 according to an embodiment of this application. FIG. 2 is an exploded view of a structure of the voice coil motor 100 according to an embodiment of this application. FIG. 3 is an exploded view of another structure of the voice coil motor 100 according to an embodiment of this application. FIG. 4 is a schematic diagram of a structure of the voice coil motor 100 with a cover removed according to an embodiment of this application. FIG. 5 is a schematic diagram of a structure in which an electromagnetic drive assembly drives a movable base 120 to move.

As shown in FIG. 1 to FIG. 5, the voice coil motor 100 provided in embodiments of this application includes a base 110, the movable base 120, a slide rail assembly, a first electromagnetic drive assembly 130, a second electromagnetic drive assembly 140, and a cover body 150.

The cover body 150 covers the base 110 to form an installing cavity. The movable base 120, the slide rail assembly, the first electromagnetic drive assembly 130, the second electromagnetic drive assembly 140, an optical lens, and the like are accommodated in the installing cavity.

As shown in FIG. 1, FIG. 2, and FIG. 4, a light inlet 160 and a light outlet 170 that are in communication with the installing cavity are further separately composed on two opposite sides of the voice coil motor 100. An optical path is composed between the light inlet 160 and the light outlet 170. In the installing cavity, an optical element such as the optical lens is disposed on the optical path. After entering from the light inlet 160, light that passes through the installing cavity is processed (for example, refracted) by the optical element such as the optical lens in the installing cavity, and is emitted from the light outlet 170.

The cover body 150 is installed on the base 110, and protects and seals each element in an installing cavity. How the cover body 150 is installed on the base 110 is not limited in this application, and includes but is not limited to a connection manner such as a screw, a buckle, or adhesive.

To reduce impact on working of the electromagnetic drive assembly inside the cavity, the cover body 150 may be made of a non-magnetic conductive material. Optionally, the cover body 150 may be made of plastic or non-magnetic conductive metal. For example, a material of the cover body 150 may be stainless steel SUS316L, or a material such as aluminum alloy, copper alloy, or magnesium alloy.

As shown in FIG. 2, the cover body 150 is in a cover shape, and includes a top plate 151 and two side plates 152 composed on two opposite sides (front and rear sides in FIG. 2) of the top plate 151. The cover body 150 is covered on the base 110. The light inlet 160 and the light outlet 170 are composed on left and right sides of the voice coil motor 100. Optionally, the cover body 150 may be composed by using a process such as forging, die casting, or injection molding. This is not limited in this application.

The slide rail assembly is composed in the installing cavity, and is configured to guide a sliding direction of the movable base 120. As shown in FIG. 4 and FIG. 5, the slide rail assembly is disposed in directions A and B. The directions A and B are directions of the optical path. A direction A represents a forward direction of light, and a direction B represents a backward direction opposite to the forward direction. Therefore, in other words, the slide rail assembly is disposed in front and rear directions, and the front and rear directions are also moving directions of the movable base 120.

A specific disposing manner of the slide rail assembly is not limited in embodiments of this application, provided that the slide rail assembly can slide and guide a direction. For example, the slide rail assembly may be a slide rail assembly of a sliding block type (a sliding block and a sliding groove that work with each other are respectively disposed on the base 110 and the movable base 120), a roller type, a steel ball type, a gear type, or the like. The following further describes the slide rail assembly provided in embodiments of this application with reference to the accompanying drawings.

The movable base 120 is configured to carry a first lens (not shown in the figure), and is slidably disposed on the base 110 through the slide rail assembly. The first lens is fastened to the movable base 120. The movable base 120 moves in the front and rear directions through the slide rail assembly, to drive the first lens to move in the front and rear directions. For example, the first lens may be driven to move forward (that is, the direction A in FIG. 4) or the first lens may be driven to move backward (that is, the direction B in FIG. 4).

Optionally, the first lens may include one lens, and the lens may be a concave lens or a convex lens.

Optionally, the first lens may alternatively include a plurality of lenses. In this case, the first lens is a lens group including the plurality of lenses, and the plurality of lenses may include a concave lens and/or a convex lens. Because the first lens may move forward and backward, the first lens may also be referred to as an adjustable lens, an adjustable lens group, a moving lens, a moving lens group, or the like.

As shown in FIG. 4 and FIG. 5, the voice coil motor 100 further includes the electromagnetic drive assembly. The electromagnetic drive assembly is configured to provide driving force for the movable base 120, to drive the movable base 120 to slide in the front and rear directions relative to the base 110.

Herein, the electromagnetic drive assembly is a combination of a coil and a magnet. The coil may be disposed on one of the base 110 and the movable base 120, and the magnet may be disposed on the other of the base 110 and the movable base 120. The coil and the magnet are disposed in parallel and opposite to each other. An interaction force can be generated between the coil and the magnet by supplying a direct current to the coil, and the movable base 120 can be driven to slide in the front and rear directions relative to the base 110. A magnitude and a direction of the interaction force can be changed by changing a magnitude and a direction of the current, so that a sliding speed, a direction, and the like of the movable base 120 can be controlled.

In embodiments of this application, the electromagnetic drive assembly includes the first electromagnetic drive assembly 130 and the second electromagnetic drive assembly 140. The first electromagnetic drive assembly 130 and the second electromagnetic drive assembly 140 are respectively disposed on two opposite sides of the slide rail assembly (that is, located on left and right sides in the front and rear directions). The first electromagnetic drive assembly 130 and the second electromagnetic drive assembly 140 work separately and do not affect each other. The two sides of the slide rail assembly may simultaneously provide driving force to the movable base 120, to drive the movable base 120 to slide smoothly in the front and rear directions relative to the base 110.

According to the voice coil motor 100 provided in embodiments of this application, the movable base 120 is disposed on the base 110 in the sliding manner through the slide rail assembly, and may slide forward and backward relative to the base 110, so that the movable base 120 has a larger moving range relative to the base 110, and the voice coil motor 100 has a larger motor stroke. Therefore, both a use requirement of telephoto photography and a use requirement of macro photography can be met, so that a user can flexibly switch between the two working modes of telephoto photography and macro photography, thereby improving use experience of the user.

For example, when telephoto photography needs to be performed, the movable base 120 may drive the first lens to move backwards to implement focusing (that is, the direction B in FIG. 4 and FIG. 5). When macro photography needs to be performed, the movable base 120 may drive the first lens to move forward to implement focusing (that is, the direction A in FIG. 4 and FIG. 5).

The voice coil motor 100 provided in embodiments of this application includes the first electromagnetic drive assembly 130 and the second electromagnetic drive assembly 140 that are respectively disposed on the two opposite sides of the slide rail assembly. The two sides of the slide rail assembly may simultaneously provide the driving force for the movable base 120. Compared with single-side force, a motion tilt angle generated when the movable base 120 slides can be avoided, so that more stable and smoother sliding of the movable base 120 can be ensured. In addition, position information of the movable base 120 collected by a displacement sensor is more accurate, and closed-loop control accuracy of the voice coil motor 100 can be improved. Therefore, photographing effect of a camera module can be improved.

Further, in embodiments of this application, the first electromagnetic drive assembly 130 and the second electromagnetic drive assembly 140 are symmetrically disposed relative to the slide rail assembly, so that symmetrical output force on both the sides can be ensured, and the motion tilt angle caused by the uneven output force can be avoided. This further improves motion stability of the movable base 120 and further improves the photographing effect of the camera module.

For example, as shown in FIG. 5, the first electromagnetic drive assembly 130 and the second electromagnetic drive assembly 140 are symmetrically disposed on two opposite sides of the movable base 120. The first electromagnetic drive assembly 130 and the second electromagnetic drive assembly 140 respectively provide driving force parallel to the front and rear directions (the direction A and B) for the movable base 120.

Figure 6:
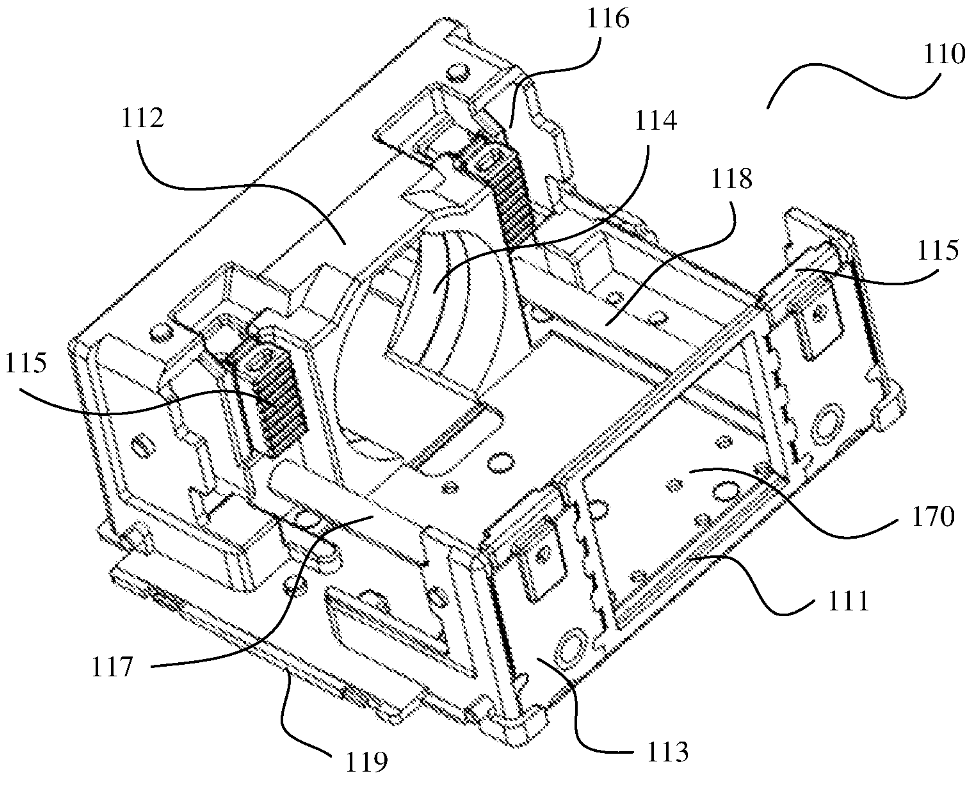
FIG. 6 is an example schematic diagram of a structure of a base according to an embodiment of this application.
Figure 7:
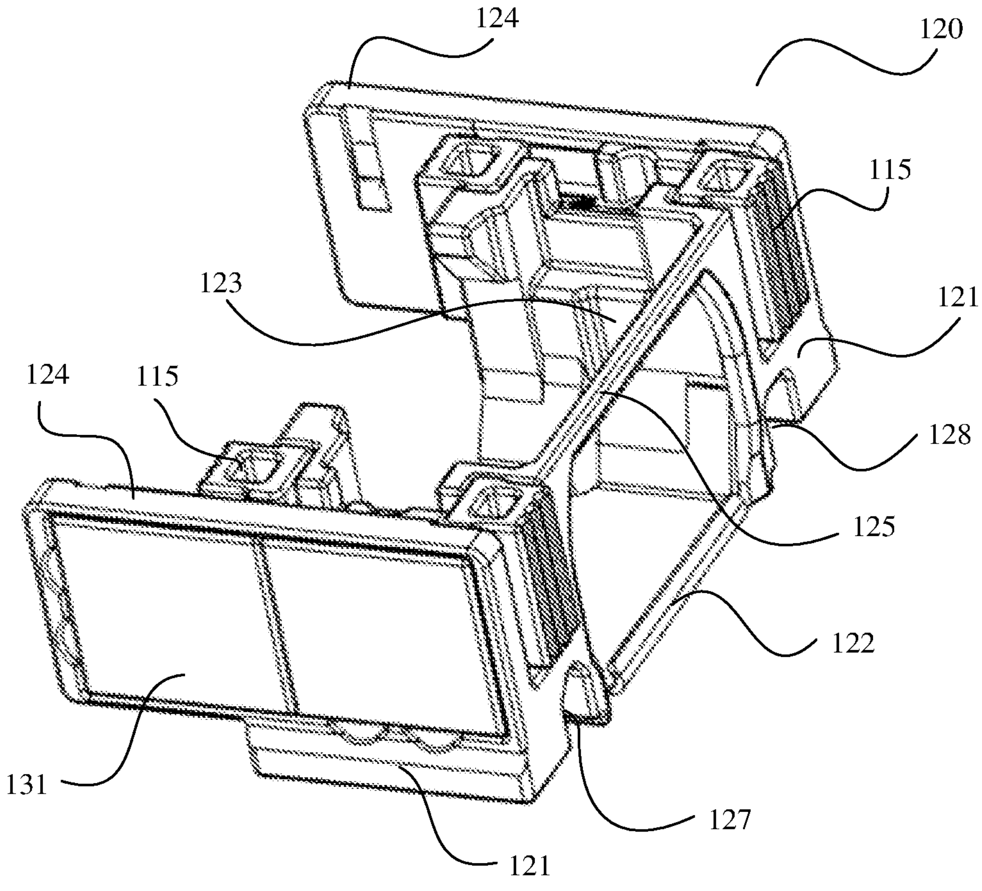
FIG. 7 is an example schematic diagram of a structure of a movable base according to an embodiment of this application.

The following further describes the slide rail assembly provided in embodiments of this application with reference to the accompanying drawings. FIG. 6 is a schematic diagram of a structure of the base 110 according to an embodiment of this application. FIG. 7 is a schematic diagram of a structure of the movable base 120 according to an embodiment of this application.

As shown in FIG. 2 and FIG. 5 to FIG. 7, the slide rail assembly in embodiments of this application includes a first sliding shaft 117 and a second sliding shaft 118 that are disposed in parallel and spaced in the base 110, and a first sliding groove 127 and a second sliding groove 128 that are disposed at the bottom of the movable base 120. The first sliding shaft 117 is slidably disposed in the first sliding groove 127, and the second sliding shaft 118 is slidably disposed in the second sliding groove 128. The slide rail assembly provided in embodiments of this application includes a sliding shaft and a sliding groove that work with each other, so that the movable base 120 slides smoothly on the base 110.

Specifically, the slide rail assembly provided in embodiments of this application includes a combination of the sliding shaft and the sliding groove that adapt to each other. The sliding shaft is fastened to the base 110, and includes the first sliding shaft 117 and the second sliding shaft 118 that are disposed in parallel and spaced. The sliding groove is correspondingly disposed at the bottom of the movable base 120, and includes the first sliding groove 127 and the second sliding groove 128 that are disposed in parallel and spaced.

The first sliding groove 127 and the second sliding groove 128 are correspondingly sleeved on the first sliding shaft 117 and the second sliding shaft 118. The sliding shaft and the sliding groove may slide relative to each other. Under action of the electromagnetic drive assembly, the movable base 120 may slide forward and backward along the sliding shaft relative to the base 110.

Optionally, in another implementation, positions of the sliding groove and the sliding shaft may be exchanged. For example, the first sliding shaft 117 and the second sliding shaft 118 may be disposed at the bottom of the movable base 120. The first sliding groove 127 and the second sliding groove 128 are composed on an upper surface of the base 110. This is not limited in this application.

Optionally, in another implementation, more combinations of sliding shafts and sliding grooves may be disposed. For example, three sliding shafts and three sliding grooves may be correspondingly disposed. This is not limited in this application.

Optionally, a friction surface of the sliding shaft and/or the sliding groove is coated with grease, so that friction force between the sliding shaft and/or the sliding groove can be reduced, and the movable base 120 slides smoothly on the base 110.

As shown in FIG. 5 and FIG. 7, the first sliding groove 127 is a V groove, the second sliding groove is a U groove, and a groove width of the U groove is greater than a width of the second sliding shaft 118. The V groove may better perform sliding guidance, and the U groove may be used for tolerance. Disposition of the U groove may allow the movable base 120 and the like to have a production error, to ensure that the movable base 120 can be successfully installed (sleeved) on the sliding shaft when a size of the movable base 120 slightly increases or decreases due to the production error. A fault tolerance rate can be improved by disposing the U groove. This helps reduce production costs.

As shown in FIG. 2 and FIG. 6, the base 110 includes a bottom plate 111, a rear limiting frame 112 fastened on a rear side of the bottom plate 111, and a front limiting frame 113 fastened on a front side of the bottom plate 111. The light inlet 160 is formed on the rear limiting frame 112, and the light outlet 170 is formed on the front limiting frame 113. Installation space for installing components such as the movable base 120, the electromagnetic drive assembly, and the slide rail assembly is formed between the rear limiting frame 112 and the front limiting frame 113.

The rear limiting frame 112 is located on a rear side of the slide rail assembly (sliding shaft). The front limiting frame 113 is located on a front side of the slide rail assembly. The rear limiting frame 112 and the front limiting frame 113 are configured to limit a sliding range of the movable base 120 in the front and rear directions.

The rear limiting frame 112, the bottom plate 111, and the front limiting frame 113 form a U-shaped structure as a whole. Front ends of the first sliding shaft 117 and the second sliding shaft 118 are fastened to the front limiting frame 113, and rear ends are fastened to the rear limiting frame 112. A gap exists between the first sliding shaft 117, the second sliding shaft 118, and the bottom plate 111, so that the movable base 120 can be smoothly installed on the first sliding shaft 117 and the second sliding shaft 118.

As shown in FIG. 6, in this embodiment of this application, a second lens installation groove 114 configured to install a second lens is disposed on the rear limiting frame 112.

Specifically, the voice coil motor 100 provided in embodiments of this application can further be installed with the second lens (not shown in the figure). The second lens is fastened to the second lens installation groove 114 disposed on the rear limiting frame 112. Light entering from the light inlet 160 is emitted into the second lens, and after being processed by the second lens, continues to be emitted into the first lens disposed on the movable base 120. Light processed by the first lens is finally emitted from the light outlet 170.

The first lens and the second lens are located on an optical axis of the optical path, and a central axis may coincide with the optical axis. The electromagnetic drive assembly drives the movable base 120 to move, so that a distance between the first lens and the second lens can be changed, and optical focusing can be performed.

Optionally, the second lens may include one lens, and the lens may be a concave lens or a convex lens.

Optionally, the second lens may alternatively include a plurality of lenses. In this case, the second lens is a lens group including the plurality of lenses, and the plurality of lenses may include a concave lens and/or a convex lens. Because the second lens is fastened inside the voice coil motor 100, the second lens may also be referred to as a fastened lens, a fastened lens group, or the like.

In this embodiment of this application, the second lens is disposed on an object side of the first lens. In another implementation, the second lens may alternatively be disposed on an image side of the first lens, for example, fastened to the front limiting frame 113. This is not limited in this application.

As shown in FIG. 6, the base 110 further includes a metal reinforcing plate 119 fastened to an outer surface of the bottom plate 111. Mechanical strength of the base 110 can be improved by disposing the metal reinforcing plate 119.

Optionally, a protrusion may be disposed on the outer surface of the bottom plate 111, a through hole is disposed at a corresponding position on the metal reinforcing plate 119, and the protrusion is embedded into the through hole, so that the metal reinforcing plate 119 is fastened to the bottom plate 111.

Optionally, to reduce impact on working of the electromagnetic drive assembly inside the cavity, the metal reinforcing plate 119 may be made of non-magnetic conductive metal. For example, a material of the metal reinforcing plate 119 may be stainless steel SUS316L, or a material such as aluminum alloy, copper alloy, or magnesium alloy.

Optionally, the metal reinforcing plate 119 is bent and extended to outer surfaces of the rear limiting frame 112 and the front limiting frame 113, so that better mechanical enhancement effect can be achieved.

As shown in FIG. 3, FIG. 4, and FIG. 6, in embodiments of this application, an elastic buffer 115 is disposed on a side that is of the rear limiting frame 112 and that faces the movable base 120. The elastic buffer 115 is disposed on a side that is of the front limiting frame 113 and that faces the movable base 120.

The elastic buffer 115 is made of an elastic material, and can buffer and absorb impact of the movable base 120, and has a structural recovery capability. For example, the elastic buffer 115 may be made of elastic soft adhesive.

In this application, the elastic buffer 115 is disposed on the side that is of the rear limiting frame 112 and that faces the movable base 120 and the side that is of the front limiting frame 113 and that faces the movable base 120, to buffer the impact of the movable base 120, avoid an abnormal sound problem caused by impact of a long stroke, and reduce dust after impact. This improves use performance of the voice coil motor 100.

As shown in FIG. 6, an installation groove may be disposed on the rear limiting frame 112. The elastic buffer 115 may be fastened (for example, embedded) to the installation groove. An outer end of the elastic buffer 115 protrudes from an inner surface of the rear limiting frame 112, so that shock absorption can be cushioned when the elastic buffer 115 collides with the movable base 120.

Optionally, to improve fastening effect, the elastic buffer 115 may be glued to the installation groove by using glue.

Similarly, the elastic buffer 115 may also be glued and fastened to the side that is of the front limiting frame 113 and that faces the movable base 120 in an adhesive manner. The outer end of the elastic buffer 115 protrudes from an inner surface of the front limiting frame 113, so that shock absorption can be cushioned when the elastic buffer 115 collides with the movable base 120.

Optionally, in another implementation, the elastic buffer 115 may be disposed only on one of the rear limiting frame 112 and the front limiting frame 113 based on a specific use requirement. This is not limited in this application.

Figure 8:
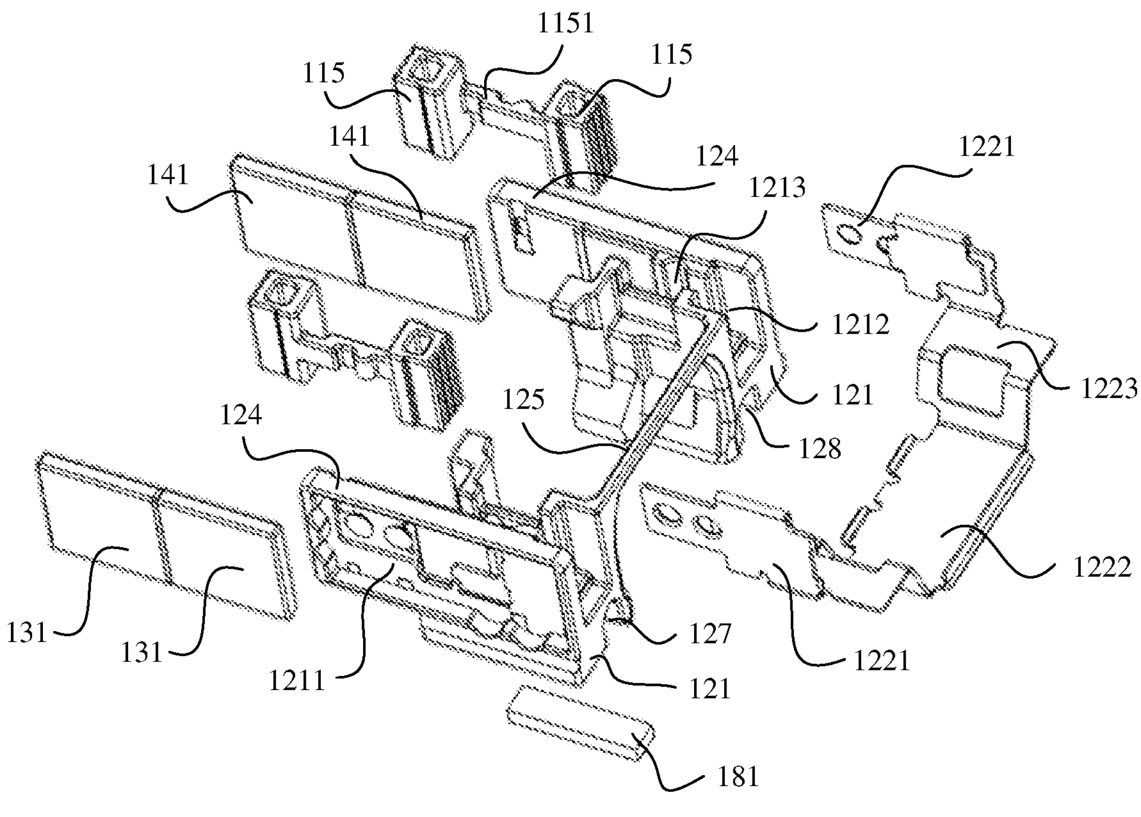
FIG. 8 is an example exploded view of a structure of a movable base according to an embodiment of this application.

FIG. 8 is an exploded view of a structure of the movable base according to an embodiment of this application.

As shown in FIG. 4, FIG. 5, FIG. 7, and FIG. 8, similarly, to further improve the shock absorption effect, the elastic buffer 115 may alternatively be disposed on a side that is of the movable base 120 and that faces the rear limiting frame 112, and the elastic buffer 115 may be disposed on a side that is of the movable base 120 and that faces the front limiting frame 113.

As shown in FIG. 8, buffer installation grooves 1212 may be disposed on two front and rear sides of the movable base 120. The elastic buffer 115 may be fastened to the grooves. The outer end of the elastic buffer 115 protrudes from a side of the movable base 120, so that shock absorption can be cushioned when the elastic buffer 115 collides with the rear limiting frame 112 or the front limiting frame 113.

As shown in FIG. 8, the movable base 120 is provided with a through groove 1213. The through groove 1213 is connected to two buffer installation grooves 1212 on the two sides of the movable base 120. The two elastic buffers 115 may be fastened through a connecting rib 1151. The two elastic buffers 115 and the connecting rib 1151 may be correspondingly accommodated in the two buffer installation grooves 1212 and the through groove 1213.

According to the foregoing disposition, installing firmness of the elastic buffer 115 can be improved, so that a misplacement failure is not likely to occur in a case of a plurality of collisions, and the use performance of the voice coil motor 100 can be improved.

Optionally, the two elastic buffers 115 and the connecting rib 1151 may be of an integrated structure. For example, the two elastic buffers 115 and the connecting rib 1151 are integrally composed by using an injection molding process.

As shown in FIG. 5 to FIG. 8, an extension part 124 is protrudingly disposed on a side that is of the movable base 120 and that faces the rear limiting frame 112. A positioning groove 116 for inserting the extension part 124 is formed on the rear limiting frame 112. The extension part 124 includes two sides symmetrically disposed on the movable base 120. Correspondingly, two positioning grooves 116 are also correspondingly disposed on two sides of the rear limiting frame 112.

The extension part 124 that extends in a direction towards the rear limiting frame 112 is disposed on the movable base 120, so that installation of the magnet can be facilitated. The positioning groove 116 is correspondingly disposed on the rear limiting frame 112, so that insertion of the extension part 124 can be facilitated. On one hand, better positioning control can be performed on sliding of the movable base 120, and on the other hand, the movable base 120 can be close to the rear limiting frame 112, so that a stroke of the movable base 120 (that is, the motor) can be increased.

The following further describes the first electromagnetic drive assembly 130 and the second electromagnetic drive assembly 140 in embodiments of this application with reference to the accompanying drawings.

As shown in FIG. 3 to FIG. 5, FIG. 7, and FIG. 8, the first electromagnetic drive assembly 130 includes a first magnet 131 and a first coil 132 that are disposed in parallel and opposite to each other. The second electromagnetic drive assembly 140 includes a second magnet 141 and a second coil 142 that are disposed in parallel and opposite to each other. The first magnet 131 and the second magnet 141 are fastened to the two opposite sides of the movable base 120, and the first coil 132 and the second coil 142 are fastened to the base 110.

Specifically, the coil of the electromagnetic drive assembly is fastened to the base 110, and the magnet is fastened to the movable base 120. After the coil is powered on, interaction force is generated between the coil and the magnet. The interaction force drives the magnet to move, and the magnet further drives the movable base (and the first lens) to move together. In other words, the voice coil motor 100 provided in embodiments of this application is a moving magnetic voice coil motor.

Optionally, in another implementation, positions of the magnet and the coil may alternatively be exchanged. In this case, the magnet is fastened to the base 110, and the coil is fastened to the movable base 120. The interaction force between the magnet and the coil may drive the coil to move, and the coil further drives the movable base (and the first lens) to move together. In other words, the voice coil motor 100 may alternatively be a moving coil voice coil motor.

As shown in FIG. 5, FIG. 7, and FIG. 8, in embodiments of this application, the first electromagnetic drive assembly 130 and the second electromagnetic drive assembly 140 are symmetrically disposed on the two opposite sides of the movable base 120. Magnet installation grooves 1211 are respectively disposed on the two sides of the movable base 120. The first magnet 131 and the second magnet 141 are respectively fastened (for example, glued) to the magnet installation grooves 1211.

Both the first magnet 131 and the second magnet 141 have N poles and S poles alternately disposed along the front and rear directions. An N pole and an S pole of the first magnet 131 face the first coil 132, and an N pole and an S pole of the second magnet 141 face the second coil 142. Herein, the front and rear directions are setting directions of the sliding shaft, that is, sliding directions of the movable base 120, and are also directions of the optical axis.

The coil is located on an outer side of the movable base 120, and is vertically disposed. The magnet faces the coil, and is also vertically disposed perpendicular to the bottom surface, so that a width of the voice coil motor 100 can be reduced.

For example, in FIG. 5, magnetic poles of the first magnet 131 in the forward direction (the direction A) are sequentially the N pole and the S pole. Magnetic poles of the second magnet 141 in the forward direction are also sequentially the N pole and the S pole. Certainly, a magnetic pole alternation sequence of the second magnet 141 may alternatively be opposite to a magnetic pole alternation sequence of the first magnet 131. For example, the magnetic poles of the second magnet 141 in the forward direction may alternatively be sequentially the S pole and the N pole.

Specifically, the installed magnet and coil are parallel to each other and are opposite to each other, and the magnetic pole of the magnet faces the coil. The coil is rectangular, including two horizontal edges parallel to the optical axis (the front and rear directions) and two vertical edges perpendicular to the optical axis. After the coil is powered on, the two horizontal edges of the coil are subjected to force of a same magnitude and opposite directions, and counteract each other. Because magnetic field directions of the two vertical edges are opposite, current directions are also opposite. In this way, the two vertical edges are subjected to force of a same direction, and the force is superimposed. In this case, the magnet is subjected to reaction force of the superimposed acting force. The reaction force can overcome friction force between the sliding shaft and the sliding groove, and push the movable base 120 to drive the first lens to move forward or backward. This implements optical focusing.

In a specific example, it is assumed that a current direction in the first coil 132 is a clockwise direction, and the magnetic poles of the first magnet 131 in the forward direction (the direction A) are successively the N pole and the S pole. In this case, two horizontal edges of the first coil 132 cancel each other by acting force of a same magnitude and opposite directions. According to the left-hand rule, a vertical edge on the left side is subject to forward acting force, and a vertical edge on the right side is also subject to forward acting force. The two forward acting force is superimposed. The first magnet 131 is subject to reaction force of the superimposed acting force, in other words, the first magnet 131 is subject to backward acting force. The backward acting force pushes the movable base 120 to drive the first lens to move backward (the direction B).

Optionally, the first magnet 131 may include a plurality of independent magnets, and the plurality of independent magnets are alternately disposed towards the magnetic poles of the first coil 132. Alternatively, the first magnet 131 may be an integrated magnetizing structure. In this case, the first magnet 131 is an entire magnet, and a surface facing the first coil 132 is a planar two-stage magnetizing structure.

Similarly, the second magnet 141 may include a plurality of independent magnets, and the plurality of independent magnets are alternately disposed towards the magnetic poles of the second coil 142. Alternatively, the second magnet 141 may be an integrated magnetizing structure. In this case, the second magnet 141 is an entire magnet, and a surface facing the second coil 142 is a planar two-stage magnetizing structure.

As shown in FIG. 2 to FIG. 4, the first coil 132 is electrically connected to a first circuit board 133, and is fastened to the base 110 through the first circuit board 133. The second coil 142 is electrically connected to a second circuit board 143, and is fastened to the base 110 through the second circuit board 143. The first circuit board 133 is electrically connected to the second circuit board 143 through a connection circuit board 144. In other words, installation and fastening of the coil and an electrical connection to an external device (for example, a control mainboard) are implemented through the circuit board.

Optionally, the first circuit board 133, the second circuit board 143, and the connection circuit board 144 may be printed circuit boards (PCB).

Optionally, the first circuit board 133, the second circuit board 143, and the connection circuit board 144 may be flexible printed circuit boards (flexible circuit, FPC), printed circuit boards, or rigid flexible printed circuit boards.

For example, the first circuit board 133, the second circuit board 143, and the connection circuit board 144 are FPCs, and are of an integrated structure.

As shown in FIG. 3, a plurality of limiting protrusions 134 are fastened to surfaces of the first circuit board 133 and the second circuit board 143 facing the inner side and around the outer side of the coil. After the first circuit board 133 and the second circuit board 143 are disposed on the base 110, the coil can be supported and protected by disposing the limiting protrusion 134. This prevents the coil from being crushed and failing.

As shown in FIG. 5, in this embodiment of this application, the first sliding shaft 117 and the second sliding shaft 118 are made of a magnetic conductive material. There is magnetic attachment force between the first magnet 131 and the first sliding shaft 117, and there is magnetic attachment force between the second magnet 141 and the second sliding shaft 118.

When there is the magnetic attachment force between the sliding shaft and the magnet, when the electronic device to which the voice coil motor 100 is applied performs photographing in any direction such as the sky, the floor, or the horizontal direction, the movable base 120 can be kept always closely attached to the sliding shaft without loosening. This maintains motion stability and improves use performance of the voice coil motor 100.

The following further describes a specific structure of the movable base 120 in embodiments of this application with reference to the accompanying drawings.

As shown in FIG. 7 and FIG. 8, the movable base 120 includes two installing brackets 121 and a metal connecting piece 122. The two installing brackets 121 are fastened through the metal connecting piece 122. Overall mechanical strength of the movable base 120 can be improved by disposing the metal connecting piece 122.

Specifically, each of two ends of the metal connecting piece 122 is fastened to an installing bracket 121. The installing bracket 121 may be a plastic part. An end part of the metal connecting piece 122 may be fastened inside (inserted into) the installing bracket 121 in an injection molding manner, so that the movable base 120 has high mechanical strength as a whole.

As shown in FIG. 7, the two installing brackets 121 and the metal connecting piece 122 jointly define a first lens installation groove 123 configured to fasten the first lens. A groove, that is, the first sliding groove 127 and the second sliding groove 128, is disposed at the bottom of each of the two installing brackets 121. Each of the two installing brackets 121 is further provided with the magnet installation groove 1211 configured to install the magnet, the buffer installation groove 1212 configured to install the elastic buffer 115, the through groove 1213, and the like.

Figure 9:
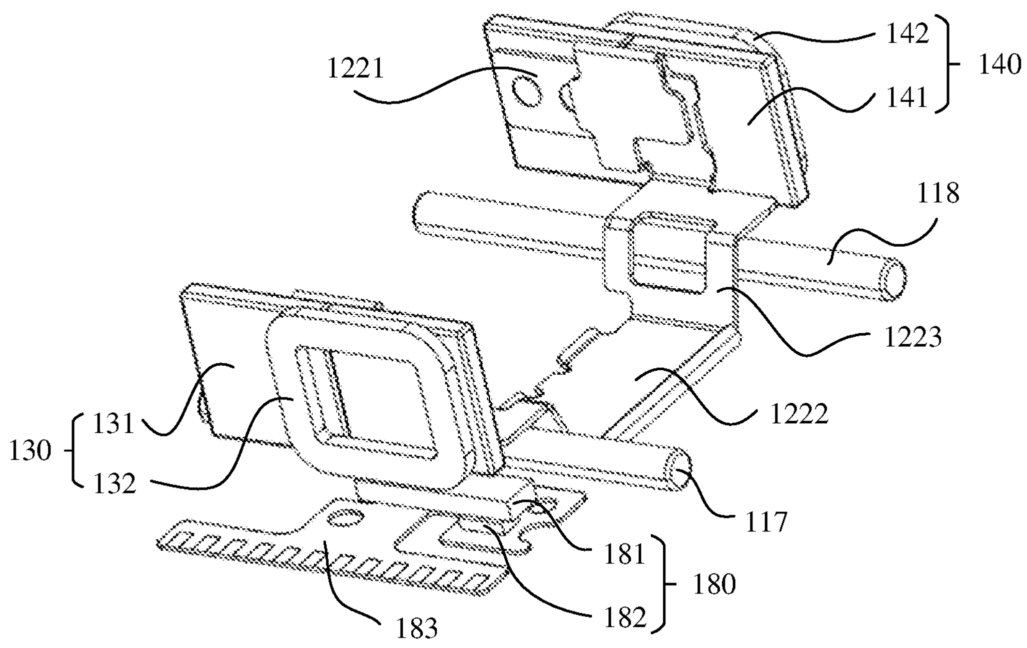
FIG. 9 is an example schematic diagram of a connection relationship of an example after an installing bracket is removed from a movable base.

FIG. 9 is a schematic diagram of a connection relationship of an example after an installing bracket 121 is removed from the movable base 120.

As shown in FIG. 8 and FIG. 9, the metal connecting piece 122 includes two magnetic conductive sheets 1221 and a support bottom 1222. The two magnetic conductive sheets 1221 are fastened through the support bottom 1222. The two magnetic conductive sheets 1221 are respectively fastened to the two installing brackets 121, and are respectively located on the inner sides of the first magnet 131 and the second magnet 141. Through the foregoing disposition, magnetic resistance on an inner side of a magnet can be reduced, and magnitude of a magnetic field on an outer side of the magnet can be increased. This helps increase output force of a coil, and further helps improve response efficiency and a speed of the movable base 120.

Optionally, the magnetic conductive sheet 1221 may include a folding portion. The folding portion enables the magnetic conductive sheet 1221 to have an overlapping portion. The overlapping portion may further reduce magnetic resistance on the inner side of the magnet, so that a magnitude of a magnetic field on the outer side of the magnet and an output force of the coil can be further improved.

As shown in FIG. 9, the support bottom 1222 is fastened to the magnetic conductive sheet 1221 through a lifting part 1223. The height of the magnet can be raised to some extent and a distance between the magnet and the sliding shaft can be increased by using the lifting part 1223, thereby enhancing magnetic attachment force between the magnet and the sliding shaft.

Optionally, the metal connecting piece 122 may be made of a magnetic conductive material by using an integrated molding process, so that mechanical stability of the metal connecting piece 122 can be improved. The integrated molding process may be, for example, forging or die casting.

As shown in FIG. 7 and FIG. 8, the upper parts of the two installing brackets 121 are further connected through a connecting beam 125, so that mechanical strength of the entire movable base 120 can be improved. The connecting beam 125 may also be used as a runner when the two installing brackets 121 are integrally composed by using an injection molding process.

As shown in FIG. 9, the voice coil motor 100 further includes a displacement sensor assembly 180 configured to sense a position of the movable base 120, and a processor configured to receive a sensing signal of the displacement sensor assembly 180 and control currents of the first coil 132 and the second coil 142. Through the foregoing disposition, the voice coil motor 100 provided in embodiments of this application can implement closed-loop control.

Optionally, the processor may be a control circuit.

As shown in FIG. 9, in this embodiment of this application, the displacement sensor assembly 180 includes a magnetic gate 181 fastened to the movable base 120 and a magnetic resistance sensor 182 fastened to the base 110. The magnetic resistance sensor 182 is configured to sense a magnetic field change of the magnetic gate 181, and transmit a sensing signal to the processor.

In this application, the magnetic gate 181 and the magnetic resistance sensor 182 that work with each other are disposed to detect the position of the movable base 120, so that the voice coil motor 100 provided in this application has a long-travel position detection capability and a closed-loop control capability.

In this embodiment of this application, a groove is disposed at the bottom of the movable base 120. The magnetic gate 181 is fastened to the groove. The magnetic resistance sensor 182 is fastened to a third circuit board 183, and is fastened to the base 110 through the third circuit board 183.

Optionally, the magnetic resistance sensor 182 is electrically connected to one end of the third circuit board 183, and a wiring terminal or a connector is disposed on the other end of the third circuit board 183, so that the third circuit board can be electrically connected to the processor conveniently.

Optionally, the magnetic resistance sensor 182 may be any one of a tunnel magnetic resistance (tunnel magnetic resistance, TMR) sensor, an anisotropic magnetic resistance (anisotropic magnetic resistance, AMR) sensor, a giant magnetic resistance (giant magnetic resistance, GMR) sensor, an ordinary magnetic resistance (ordinary magnetic resistance, OMR) sensor, or the like.

Figure 10:
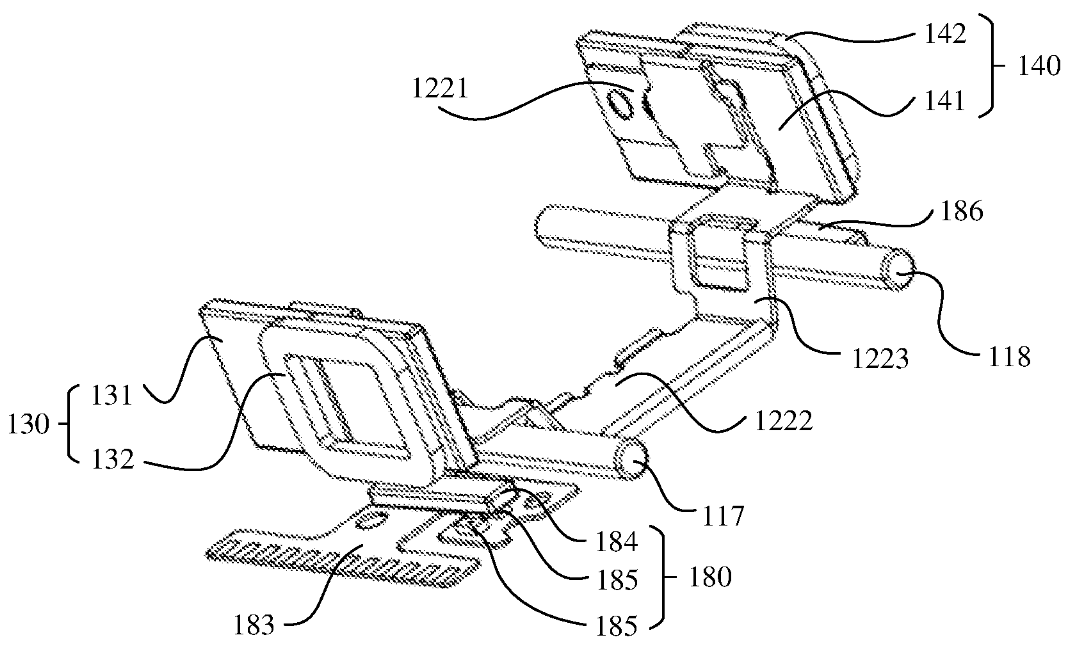
FIG. 10 is an example schematic diagram of a connection relationship of another example after an installing bracket is removed from a movable base.

FIG. 10 is a schematic diagram of a connection relationship of another example after the installing bracket 121 is removed from the movable base 120.

Compared with the foregoing embodiment shown in FIG. 9, in the embodiment shown in FIG. 10, the displacement sensor assembly 180 may further include a combination of a Hall effect sensor and a magnet.

In this embodiment, the displacement sensor assembly 180 includes a third magnet 184 fastened to the movable base 120, and two Hall effect sensors 185 fastened to the base 110. A disposing direction of the third magnet 184 is disposed obliquely relative to the front and rear directions (that is, relative to the sliding shaft). The two Hall effect sensors 185 are configured to sense a magnetic field change of the third magnet 184, and transmit the sensing signal to the processor.

Specifically, an oblique groove is disposed at the bottom of the movable base 120. The third magnet 184 is fastened to the oblique groove. The two Hall effect sensors 185 are fastened to the third circuit board 183, and are fastened to the base 110 through the third circuit board 183.

In this application, the third magnet and the two Hall effect sensors 185 that work with each other are disposed to detect the position of the movable base 120, so that the voice coil motor 100 provided in this application has a long-travel position detection capability and a closed-loop control capability. In addition, a moving position of the movable base 120 can be accurately determined based on the sensing signal of the two Hall effect sensors and a preset algorithm, so that precise focusing can be implemented.

As shown in FIG. 10, the voice coil motor 100 further includes a fourth magnet 186 fastened to the bottom of the movable base 120. The fourth magnet 186 and the third magnet 184 are symmetrically disposed relative to the slide rail assembly. The fourth magnet 186 is disposed to balance gravity on the two sides of the movable base 120 and the magnetic attachment force between the movable base and the sliding shaft, thereby facilitating stable and smooth sliding of the movable base 120, and improving use performance of the voice coil motor 100.

As shown in FIG. 1 to FIG. 10, in this embodiment, the first sliding shaft 117 and the second sliding shaft 118 are horizontally spaced and parallelly disposed on the two sides of the base 110. Correspondingly, the first sliding groove 127 and the second sliding groove 128 are disposed in parallel and spaced at the bottom of the movable base 120. In another implementation, the sliding shaft and the groove may alternatively be disposed in another manner. This is not limited in this application. For example, FIG. 11 and FIG. 12 show another manner of disposing the sliding shaft and the groove.

Figure 11:
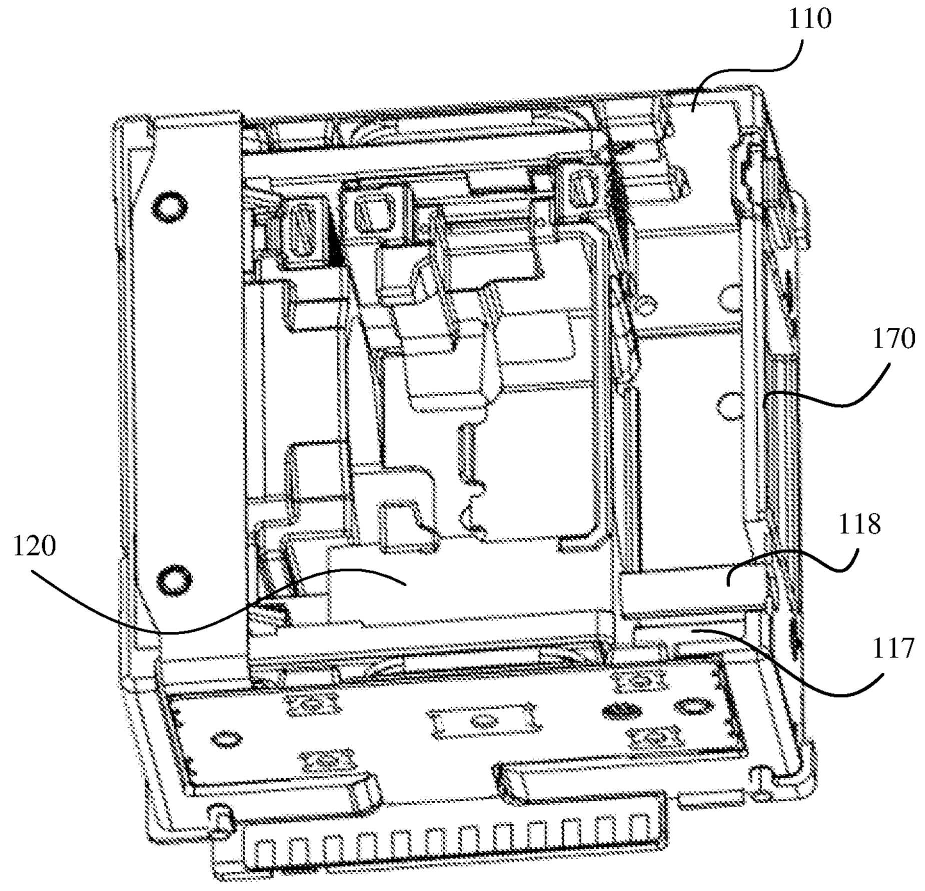
FIG. 11 is an example schematic diagram of a structure of another example of a voice coil motor with a cover removed according to an embodiment of this application.

FIG. 11 is a schematic diagram of a structure of another example of the voice coil motor 100 with a cover removed according to an embodiment of this application. FIG. 12 is a schematic diagram of a structure of installing the movable base 120 of the voice coil motor 100 shown in FIG. 11.

Figure 12:
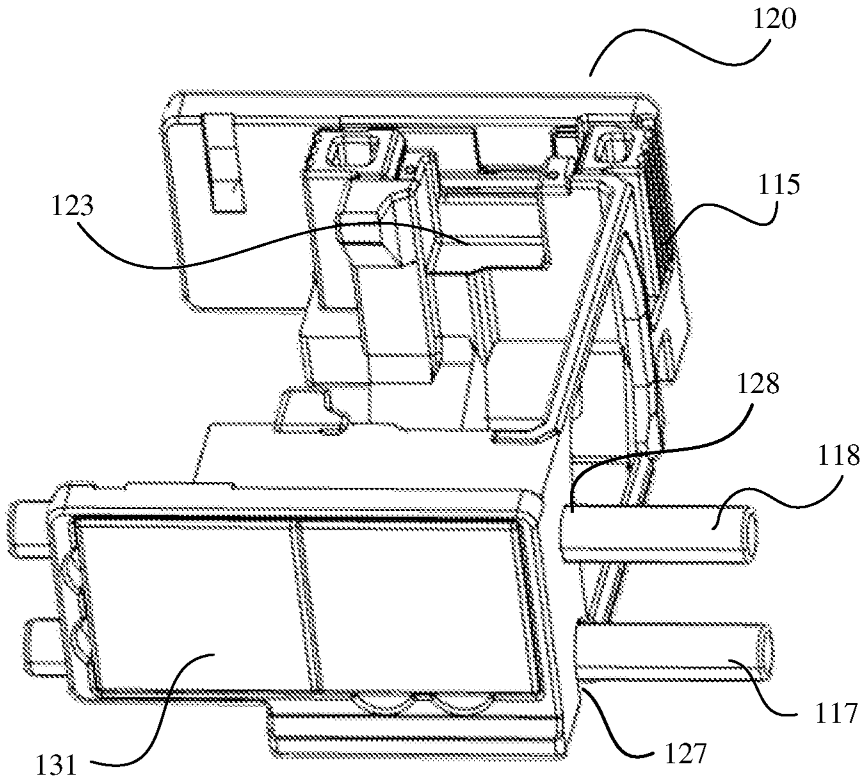
FIG. 12 is an example schematic diagram of a structure of installing the movable base of the voice coil motor shown in FIG. 11.

As shown in FIG. 11 and FIG. 12, compared with embodiments shown in FIG. 1 to FIG. 10, in this embodiment, the first sliding shaft 117 and the second sliding shaft 118 are spaced in a vertical direction and are disposed in parallel on the base 110.

Specifically, in this embodiment, a manner of disposing the first sliding shaft 117 and the first sliding groove 127 is the same as that in the foregoing embodiments. The second sliding shaft 118 is located at the upper end of the first sliding shaft 117. The first sliding shaft 117 and the second sliding shaft 118 are disposed in parallel and spaced. The first sliding shaft 117 and the second sliding shaft 118 are located on a same vertical plane.

Because disposing position of the second sliding shaft 118 is changed, a disposing manner of the second sliding groove 128 in this embodiment is also different. As shown in FIG. 12, the second sliding groove 128 is in a shape of a through hole. The through hole penetrates through the front and rear sides of the movable base 120. The second sliding shaft 118 penetrates through the through hole, and relative sliding may be generated between the second sliding shaft 118 and the through hole.

The shape and the size of the through hole adapt to the shape and the size of the cross section of the second sliding shaft 118. In this embodiment, the cross section of the second sliding shaft 118 is circular, and correspondingly, the shape of the through hole is also circular. The size rate of the through hole is greater than the size of the second sliding shaft 118. On one hand, it can be ensured that the second sliding shaft 118 smoothly penetrates into the through hole, and on the other hand, it needs to be ensured that a motion other than forward and backward sliding is generated between the movable base 120 and the second sliding shaft 118, for example, relative jump or swing.

In embodiments shown in FIG. 1 to FIG. 10 and FIG. 11 to FIG. 12, the electromagnetic drive assembly is disposed on the two sides of the movable base 120. In another implementation, the electromagnetic drive assembly may alternatively be disposed at another location. This is not limited in this application. For example, in embodiments shown in FIG. 13 to FIG. 15, the electromagnetic drive assembly may be further disposed at the bottom of the movable base 120.

Figure 13:
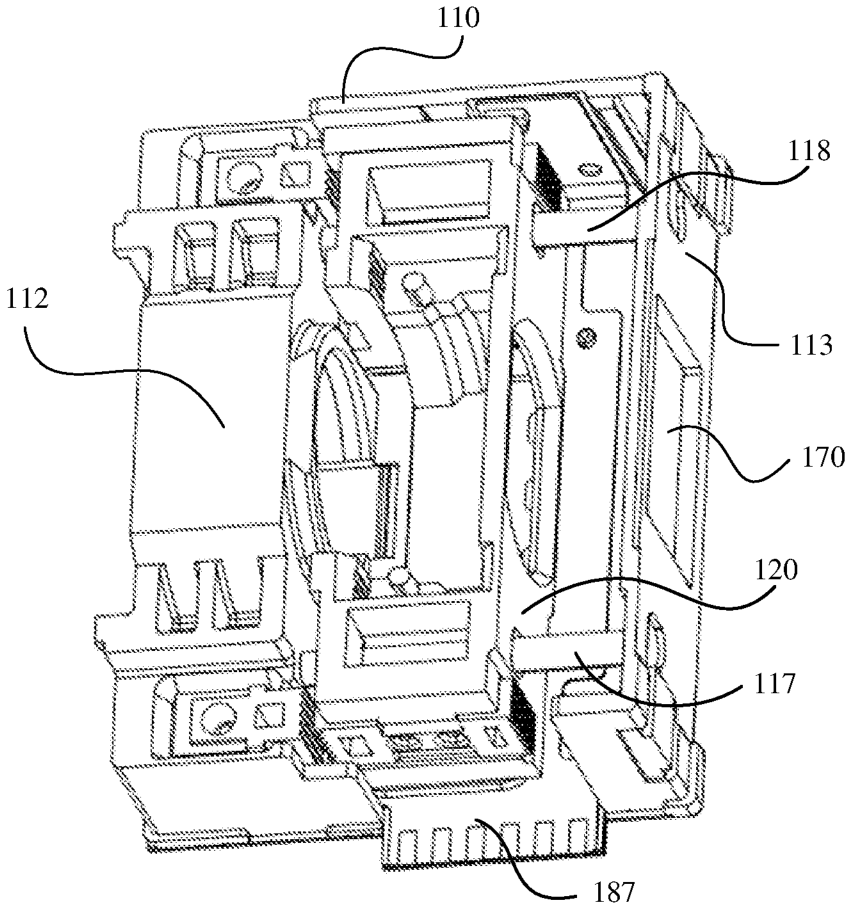
FIG. 13 is an example schematic diagram of a structure of still another example of a voice coil motor after a cover is removed according to an embodiment of this application.
Figure 14:
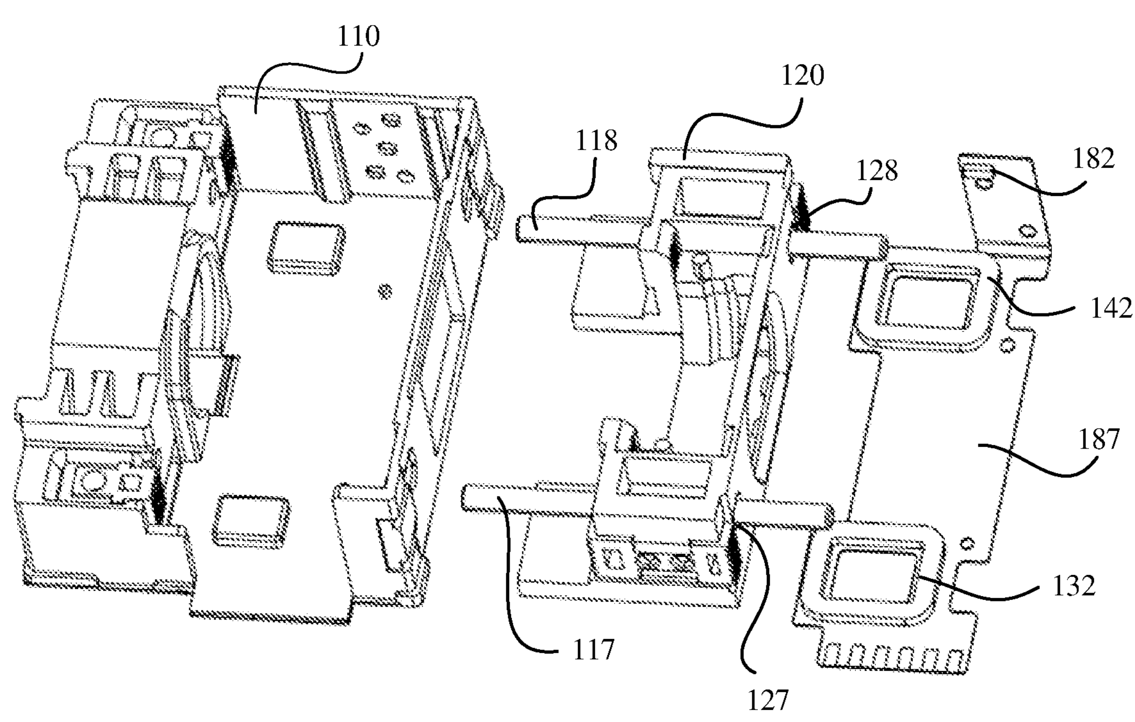
FIG. 14 is an example exploded view of a structure of the voice coil motor shown in FIG. 13.
Figure 15:
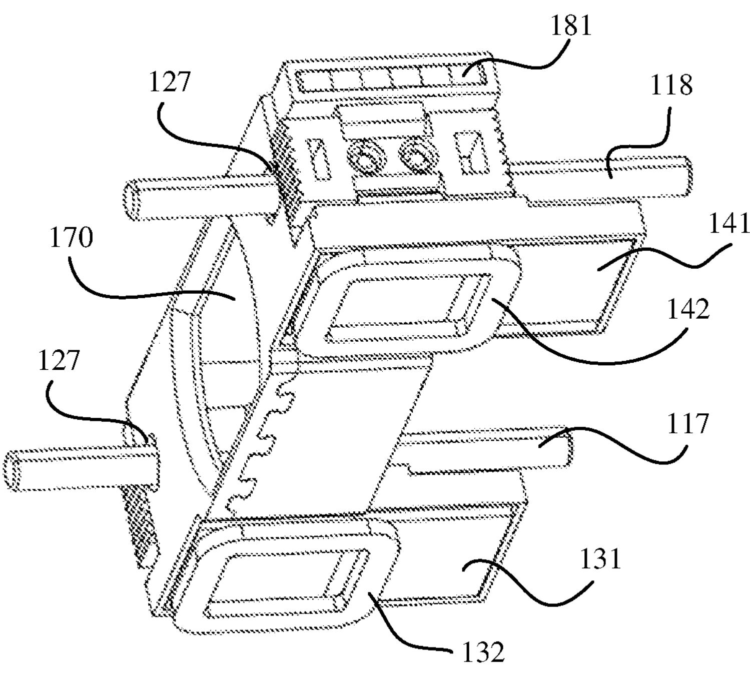
FIG. 15 is an example schematic diagram of a structure in which an electromagnetic drive assembly of the voice coil motor shown in FIG. 13 drives a movable base to move.

FIG. 13 is a schematic diagram of a structure of still another example of a voice coil motor after a cover is removed according to an embodiment of this application. FIG. 14 is an exploded view of a structure of the voice coil motor shown in FIG. 13. FIG. 15 is a schematic diagram of a structure in which an electromagnetic drive assembly of the voice coil motor shown in FIG. 13 drives a movable base to move.

As shown in FIG. 13 to FIG. 15, the electromagnetic drive assembly is disposed at the bottom of the movable base 120. To ensure that the electromagnetic drive assembly can smoothly drive the movable base 120 to slide forward and backward (without departing from the base 110), in this embodiment, a manner of disposing the sliding shaft and the groove is further adjusted.

Specifically, in this embodiment, the first sliding shaft 117 and the second sliding shaft 118 are horizontally spaced and parallelly disposed on the two sides of the base 110. The first sliding groove 127 and the second sliding groove 128 are both in a closed through-hole shape, parallel and spaced inside the movable base 120. The first sliding groove 127 and the second sliding groove 128 horizontally penetrate the front and rear sides of the movable base 120. The first sliding shaft 117 and the second sliding shaft 118 are correspondingly disposed in the first sliding groove 127 and the second sliding groove 128, and may generate relative sliding.

As shown in FIG. 14 and FIG. 15, both the first electromagnetic drive assembly 130 and the second electromagnetic drive assembly 140 are disposed between the movable base 120 and the base 110, and are located on the left and right sides of the bottom of the movable base 120. The first electromagnetic drive assembly 130 is located on one side of the first sliding shaft 117, and the second electromagnetic drive assembly 140 is located on the other side of the second sliding shaft 118. The first electromagnetic drive assembly 130 and the second electromagnetic drive assembly 140 work separately, and do not affect each other.

A groove is disposed at the bottom of the movable base 120. The first magnet 131 and the second magnet 141 are separately disposed in the groove. The first coil 132 is located at the bottom of the first magnet 131. The first coil 132 and the first magnet 131 are disposed in parallel and opposite to each other. The second coil 142 is located at the bottom of the second magnet 141. The second coil 142 and the second magnet 141 are disposed in parallel and opposite to each other.

As shown in FIG. 14 and FIG. 15, to implement electrical connection, the first coil 132 and the second coil 142 are fastened to a fourth circuit board 187. The fourth circuit board 187 is in an "L" shape. A magnetic resistance sensor 182 is disposed at the front end of the fourth circuit board 187. The magnetic resistance sensor 182 is configured to sense a magnetic field change of the magnetic gate 181 disposed in a side groove of the movable base 120. A connection terminal or a connector is disposed at the rear end of the fourth circuit board 187, and passes through a housing of the voice coil motor 100, to implement an electrical connection to an external device (for example, a processor).

In embodiments shown in FIG. 1 to FIG. 10, FIG. 11 to FIG. 12, and FIG. 13 to FIG. 15, the magnet and the coil in the electromagnetic drive assembly are disposed opposite to each other and in parallel. In another implementation, the electromagnetic drive assembly may alternatively be disposed in another manner. This is not limited in this application. For example, in the embodiment shown in FIG. 16, the magnet and the coil in the electromagnetic drive assembly may alternatively be vertically disposed.

Figure 16:
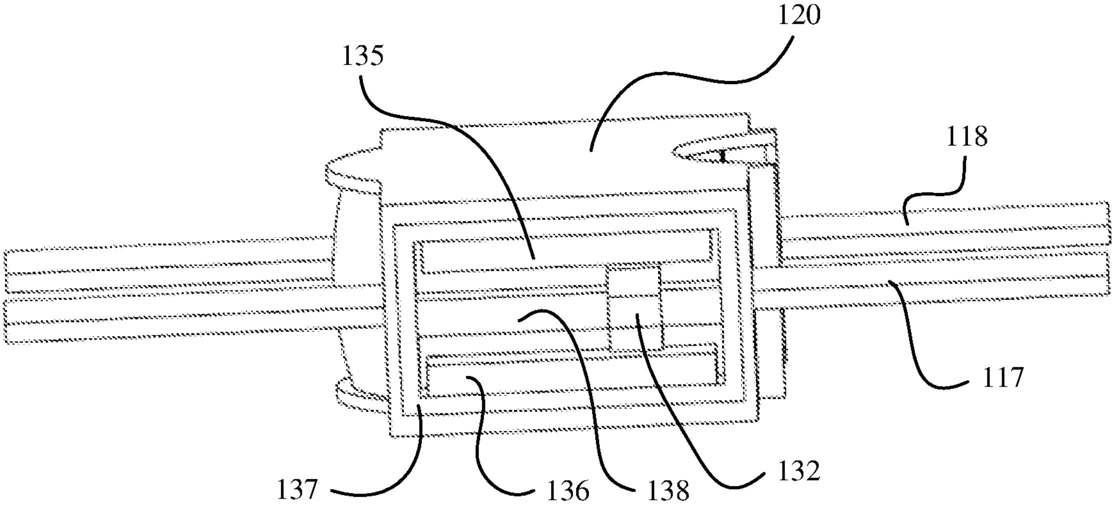
FIG. 16 is an example schematic diagram of an installation structure of an electromagnetic drive assembly.

FIG. 16 is a schematic diagram of an installation structure of an electromagnetic drive assembly. FIG. 16 shows only the first electromagnetic drive assembly 130. In this embodiment, the first electromagnetic drive assembly 130 is used as an example to describe a disposing manner of the electromagnetic drive assembly. The second electromagnetic drive assembly 140 that is not shown in the figure may be symmetrically disposed on the other side of the movable base 120 in a manner the same as that of the first electromagnetic drive assembly 130. A disposing manner of the second electromagnetic drive assembly 140 may be understood with reference to the disposing manner of the first electromagnetic drive assembly 130.

As shown in FIG. 16, the movable base 120 is sleeved outside the first sliding shaft 117 and the second sliding shaft 118. The first electromagnetic drive assembly 130 is configured to drive the movable base 120 to slide relative to the first sliding shaft 117 and the second sliding shaft 118.

The first electromagnetic drive assembly 130 includes the first coil 132, a fifth magnet 135, and a sixth magnet 136. The fifth magnet 135 and the sixth magnet 136 are opposite to each other and are disposed in parallel and spaced. The first coil 132 is vertically disposed between the fifth magnet 135 and the sixth magnet 136. Sides of the fifth magnet 135 and the sixth magnet 136 facing the first coil 132 have a same magnetic pole polarity. In other words, polarities of magnetic poles of the sides that are of the fifth magnet 135 and the sixth magnet 136 and that are opposite to each other are the same.

Specifically, as shown in FIG. 16, the polarities of the sides that are of the fifth magnet 135 and the sixth magnet 136 and that face the first coil 132 are the same, for example, both are N poles or both are S poles. According to the left-hand rule, directions of electromagnetic forces applied to upper and lower sides of the first coil 132 that are perpendicular to a paper direction in FIG. 16 are the same, and are leftward or rightward, to drive the movable base 120 to slide forward and backward.

The voice coil motor including the electromagnetic drive assembly shown in FIG. 16 may be of a moving magnetic type, or may be of a moving coil type. This is not limited in this application.

Optionally, the voice coil motor including the electromagnetic drive assembly shown in FIG. 16 may be a moving magnetic voice coil motor. In this case, the fifth magnet 135 and the sixth magnet 136 are fastened to the movable base 120, and the first coil 132 is fastened to the base 110.

For example, a groove may be disposed on a side part of the movable base 120. The fifth magnet 135 and the sixth magnet 136 are fastened to the groove. The first coil 132 is fastened to the base 110 through a side edge parallel to the paper direction and close to an outer side.

As shown in FIG. 16, the electromagnetic drive assembly further includes a magnetic conductive frame 137. The magnetic conductive frame 137 wraps the outer circumferences of the fifth magnet 135 and the sixth magnet 136, so that magnetic field strength between the fifth magnet 135 and the sixth magnet 136 can be enhanced, and coil output can be enhanced.

Further, a magnetic conductive insertion block 138 is further fastened between the fifth magnet 135 and the sixth magnet 136 in the magnetic conductive frame 137. The first coil 132 is sleeved on an outer circumference of the magnetic conductive insertion block 138. Magnetic field intensity can also be enhanced by disposing the magnetic conductive insertion block 138, to enhance the output force of the coil.

Optionally, the voice coil motor including the electromagnetic drive assembly shown in FIG. 16 may also be a moving coil voice coil motor. In this case, the fifth magnet 135 and the sixth magnet 136 are fastened to the base 110, and the first coil 132 is fastened to the movable base 120.

Compared with the foregoing embodiment, the coil of the electromagnetic drive assembly provided in this embodiment is located in a stronger magnetic field, and can provide a larger driving force.

Figure 17:
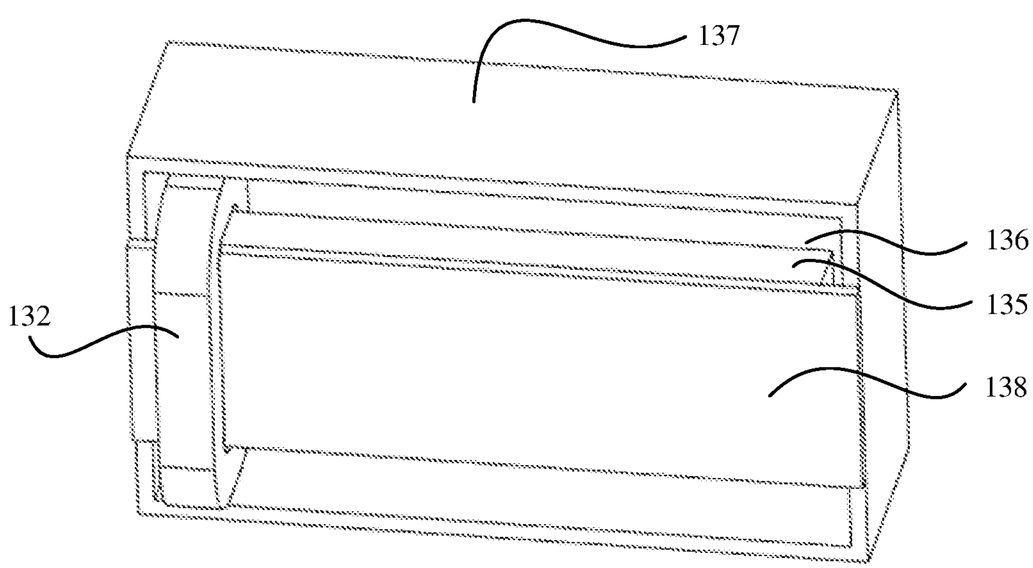
FIG. 17 is an example schematic diagram of another installation structure of an electromagnetic drive assembly.

FIG. 17 is a schematic diagram of another installation structure of an electromagnetic drive assembly. Compared with the embodiment shown in FIG. 16, in this embodiment, a first coil 132 is sleeved on an outer circumference of a fifth magnet 135.

Specifically, as shown in FIG. 17, in this embodiment, the first electromagnetic drive assembly 130 includes the first coil 132, the fifth magnet 135, and the sixth magnet 136. The fifth magnet 135 and the sixth magnet 136 are opposite to each other and are disposed in parallel and spaced. The first coil 132 sleeves the circumference of the fifth magnet 135 and is perpendicular to the fifth magnet. Polarities of magnetic poles on sides of the fifth magnet 135 and the sixth magnet 136 that are opposite to each other are opposite.

For example, polarities of sides that are of the fifth magnet 135 and the sixth magnet 136 and that are opposite to each other are opposite, one is an N pole, and the other is an S pole. According to the left-hand rule, a leftward or rightward electromagnetic force is applied to a side edge that is of the first coil 132 and that is located between two magnets in FIG. 17, to drive the movable base 120 to slide forward and backward.

The voice coil motor including the electromagnetic drive assembly shown in FIG. 17 may be of a moving magnetic type, or may be of a moving coil type. This is not limited in this application.

Optionally, the voice coil motor including the electromagnetic drive assembly shown in FIG. 17 may be a moving magnetic voice coil motor. In this case, the fifth magnet 135 and the sixth magnet 136 are fastened to the movable base 120, and the first coil 132 is fastened to the base 110.

Optionally, the voice coil motor including the electromagnetic drive assembly shown in FIG. 17 may also be a moving coil voice coil motor. In this case, the fifth magnet 135 and the sixth magnet 136 are fastened to the base 110, and the first coil 132 is fastened to the movable base 120.

As shown in FIG. 17, the magnetic conductive insertion block 138 is located on the outer side of the fifth magnet 135, and is located inside the first coil 132. In other words, the first coil 132 is also sleeved on the outer circumference of the magnetic conductive insertion block 138. Through the foregoing disposition, magnetic field intensity between magnets can be enhanced, to enhance the output force of the coil.

Figure 18:
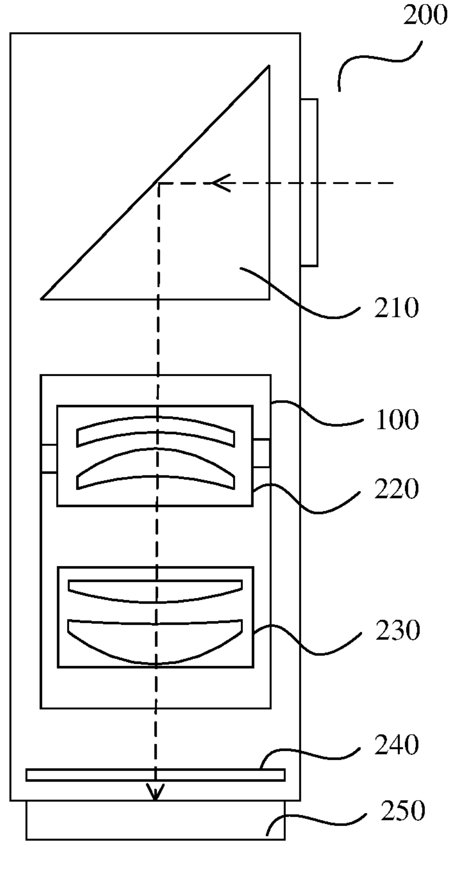
FIG. 18 is an example schematic diagram of a structure of a camera module according to an embodiment of this application.

According to another aspect, an embodiment of this application further provides a camera module. FIG. 18 is a schematic diagram of a structure of a camera module 200 according to an embodiment of this application.

As shown in FIG. 18, the camera module 200 includes a first lens 230 and the voice coil motor 100 provided in any one of the foregoing embodiments. The voice coil motor 100 is configured to drive the first lens 230 to move, to implement optical focusing.

Optionally, the camera module 200 further includes a second lens 220 disposed in an object side direction of the first lens 230, and an image sensor 250 disposed in an image side direction of the first lens 230.

For example, the second lens 220 may be fastened to a second lens installation groove 114 of the voice coil motor 100.

For example, the image sensor 250 may be a complementary metal-oxide-semiconductor (CMOS) image sensor or a charge coupled device (CCD) image sensor. The image sensor 250 is mainly configured to perform optical-to-electrical conversion and analog/digital (A/D) conversion on an optical signal of light, to output image data to be displayed by a display unit such as a display screen.

Optionally, the camera module 200 further includes a reflective element 210 disposed in an object side direction of the second lens 220. In other words, the camera module 200 may be a periscope camera module.

For example, the reflective element 210 may be a triangular prism or a reflector.

Optionally, an infrared filter 240 is further disposed between the first lens 230 and the image sensor 250. An infrared ray can be cut off, filtered, and the like by disposing the infrared filter 240, thereby improving imaging quality. The infrared filter 240 may be, for example, a white glass filter or a blue glass filter.

Because the camera module 200 uses the voice coil motor 100 provided in any one of the foregoing embodiments, the camera module 200 also has a technical effect corresponding to the voice coil motor 100.

Figure 19:
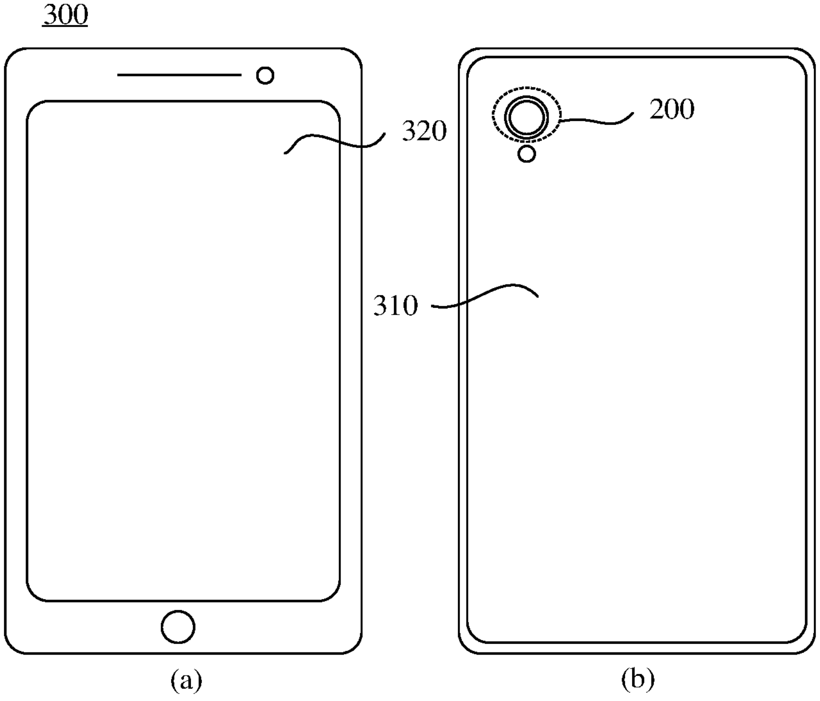
FIG. 19 is an example schematic diagram of a structure of an electronic device according to an embodiment of this application.

According to still another aspect, an embodiment of this application further provides an electronic device. FIG. 19 is a schematic diagram of a structure of an electronic device 300 according to an embodiment of this application.

Part (a) in FIG. 19 and part (b) in FIG. 19 are respectively a front view and a rear view of the electronic device 300. As shown in FIG. 19, the electronic device 300 includes the camera module 200 provided in the foregoing embodiment, and further includes a housing 310 and a display screen 320. The display screen 320 is installed on the housing 310. Accommodation space is composed in the housing 310. The camera module 200 may be installed in the accommodation space. The display screen 320 can be configured to display a picture or a video taken by the camera module 200.

Optionally, the housing 310 may be a metal housing, for example, a metal such as magnesium alloy or stainless steel. In addition, the housing may also be a plastic housing, a glass housing, a ceramic housing, or the like, but is not limited thereto.

Optionally, the display screen 320 may be, but is not limited to, a light emitting diode (LED) display, a liquid crystal (LCD) display, an organic light emitting diode (OLED) display, or the like.

Optionally, the housing 310 may further include another component, for example, a battery, a flash, a fingerprint recognition module, an earpiece, a circuit board, or a sensor. However, this is not limited thereto.

Optionally, the electronic device 300 may be a terminal device having a photographing or photographing function, for example, a mobile phone, a tablet computer, a laptop computer, a video camera, a video recorder, a camera, an intelligent robot, in-vehicle surveillance, or a device having the photographing or photographing function in another form.

Because the camera module 200 provided in the foregoing embodiment is used in the electronic device 300, the electronic device 300 also has a technical effect corresponding to the camera module 200.

The foregoing descriptions are specific implementations of this application, but the protection scope of this application is not limited thereto. Any variation or replacement that can be readily figured out by the person skilled in the art within the technical scope disclosed in this application shall fall within the protection scope of this application. Therefore, the protection scope of this application shall be subject to the protection scope of the claims.

What is claimed is:

1. A voice coil motor, comprising:
- a base;
- a slide rail assembly disposed along front and rear directions of an optical path;
- a movable base configured to carry a first lens, wherein the movable base is slidably disposed on the base through the slide rail assembly;
- a first electromagnetic drive assembly;
- a second electromagnetic drive assembly;
- an extension part; and
- a positioning groove for inserting the extension part, wherein
  - the first electromagnetic drive assembly and the second electromagnetic drive assembly are configured to supply driving force to the movable base, to drive the movable base to slide in the front and rear directions of the base,
  - the first electromagnetic drive assembly is disposed on a first side of the slide rail assembly,
  - the second electromagnetic drive assembly is disposed on a second side, of the slide rail assembly, opposite to the first side of the slide rail assembly,
  - the base comprises a rear limiting frame located on a rear side of the slide rail assembly and a front limiting frame located on a front side of the slide rail assembly,
  - the rear limiting frame and the front limiting frame are configured to limit a sliding range of the movable base in the front and rear directions of an optical path,
  - the extension part is protrudingly disposed on a side of the movable base facing the rear limiting frame, and
  - the positioning groove is formed on the rear limiting frame.

2. The voice coil motor according to claim 1, wherein the slide rail assembly comprises:
- a first sliding shaft;
- a second sliding shaft;
- a first sliding groove; and
- a second sliding groove, wherein
- the first sliding shaft and the second sliding shaft are disposed in parallel and spaced on the base,
- the first sliding groove and the second sliding groove are disposed at a bottom of the movable base
- the first sliding shaft is slidably disposed in the first sliding groove, and
- the second sliding shaft is slidably disposed in the second sliding groove.

3. The voice coil motor according to claim 2, wherein
- the first sliding groove is a V groove,
- the second sliding groove is a U groove having a first groove width, and the first groove width of the U groove is greater than a width of the second sliding shaft.

4. The voice coil motor according to claim 2, wherein
- the first electromagnetic drive assembly comprises a first magnet and a first coil, wherein the first magnet and the first coil are parallel to each other and disposed opposite to each other,
- the second electromagnetic drive assembly comprises a second magnet and a second coil, wherein the second magnet and the second coil are parallel to each other and disposed opposite to each other, and
- the first magnet and the second magnet are fastened to two opposite sides of the movable base, and the first coil and the second coil are fastened to the base.

5. The voice coil motor according to claim 4, wherein
- both the first magnet and the second magnet have N poles and S poles alternately disposed along the front and rear directions of an optical path,
- an N pole and an S pole of the first magnet face the first coil, and an N pole and an S pole of the second magnet face the second coil,
- the first magnet is composed of a plurality of independent magnets, or the first magnet is an integrated magnetizing structure, and
- the second magnet is composed of the plurality of independent magnets, or the second magnet is the integrated magnetizing structure.

6. The voice coil motor according to claim 4, wherein the first coil is electrically connected to a first circuit board, and the first coil is fastened to the base through the first circuit board, the second coil is electrically connected to a second circuit board, and the second coil is fastened to the base through the second circuit board, and the first circuit board is electrically connected to the second circuit board through a connection circuit board.

7. The voice coil motor according to claim 4, wherein the first sliding shaft and the second sliding shaft are made of magnetic conductive materials, a magnetic attachment force exists between the first magnet and the first sliding shaft, and a magnetic attachment force exists between the second magnet and the second sliding shaft.

8. The voice coil motor according to claim 4, further comprising:

a displacement sensor assembly configured to sense a position of the movable base; and a processor configured to receive a sensing signal of the displacement sensor assembly and control currents of the first coil and the second coil.

9. The voice coil motor according to claim 8, wherein the displacement sensor assembly comprises a magnetic gate fastened to the movable base and a magnetic resistance sensor fastened to the base, and the magnetic resistance sensor is configured to sense a magnetic field change of the magnetic gate and transmit the sensing signal to the processor.

10. The voice coil motor according to claim 8, wherein the displacement sensor assembly comprises a third magnet fastened to the movable base and two Hall effect sensors fastened to the base, a magnetic pole direction of the third magnet is disposed obliquely relative to the front and rear directions, and the two Hall effect sensors are configured to sense a magnetic field change of the third magnet, and transmit the sensing signal to the processor.

11. The voice coil motor according to claim 10, further comprising:

a fourth magnet fastened to a bottom of the movable base, wherein the fourth magnet and the third magnet are symmetrically disposed opposite to the slide rail assembly.

12. The voice coil motor according to claim 4, wherein the movable base comprises two installing brackets and a metal connecting piece, and the two installing brackets are fastened through the metal connecting piece.

13. The voice coil motor according to claim 1, further comprising:

an elastic buffer, wherein the elastic buffer is disposed on a side of the rear limiting frame facing the movable base, the elastic buffer is disposed on a side of the front limiting frame facing the movable base, the elastic buffer is disposed on a side of the movable base facing the rear limiting frame, or the elastic buffer is disposed on a side of the movable base facing the front limiting frame.

14. The voice coil motor according to claim 1, further comprising:

a second lens installation groove for disposing a second lens, wherein the second lens installation groove is disposed on the rear limiting frame.

15. A camera module, comprising:

a first lens; and a voice coil motor, wherein the voice coil motor comprises:

a base;

a slide rail assembly disposed along front and rear directions of an optical path;

a movable base configured to carry the first lens, wherein the movable base is slidably disposed on the base through the slide rail assembly;

a first electromagnetic drive assembly;

a second electromagnetic drive assembly;

an extension part; and a positioning groove for inserting the extension part, wherein the first electromagnetic drive assembly and the second electromagnetic drive assembly are configured to supply driving force to the movable base, to drive the movable base to slide in the front and rear directions of the base, the first electromagnetic drive assembly is disposed on a first side of the slide rail assembly, the second electromagnetic drive assembly is disposed on a second side, of the slide rail assembly, opposite to the first side of the slide rail assembly, the voice coil motor is configured to drive the first lens to move, the base comprises a rear limiting frame located on a rear side of the slide rail assembly and a front limiting frame located on a front side of the slide rail assembly, the rear limiting frame and the front limiting frame are configured to limit a sliding range of the movable base in the front and rear directions of an optical path, the extension part is protrudingly disposed on a side of the movable base facing the rear limiting frame, and the positioning groove is formed on the rear limiting frame.

16. An electronic device, comprising:

a camera module, wherein the camera module comprises a first lens and a voice coil motor, and the voice coil motor comprises:

a base;

a slide rail assembly disposed along front and rear directions of an optical path;

a movable base configured to carry the first lens, wherein the movable base is slidably disposed on the base through the slide rail assembly;

a first electromagnetic drive assembly;

a second electromagnetic drive assembly;

an extension part; and a positioning groove for inserting the extension part, wherein the first electromagnetic drive assembly and the second electromagnetic drive assembly are configured to supply driving force to the movable base, to drive the movable base to slide in the front and rear directions of the base, the first electromagnetic drive assembly is disposed on a first side of the slide rail assembly, the second electromagnetic drive assembly is disposed on a second side, of the slide rail assembly, opposite to the first side of the slide rail assembly, the voice coil motor is configured to drive the first lens to move, the base comprises a rear limiting frame located on a rear side of the slide rail assembly and a front limiting frame located on a front side of the slide rail assembly, the rear limiting frame and the front limiting frame are configured to limit a sliding range of the movable base in the front and rear directions of an optical path, the extension part is protrudingly disposed on a side of the movable base facing the rear limiting frame, and the positioning groove is formed on the rear limiting frame.

* * * * *